United States Patent
Ahn et al.

(10) Patent No.: US 11,892,849 B2
(45) Date of Patent: Feb. 6, 2024

(54) MOVING ROBOT AND CONTROL METHOD THEREOF

(71) Applicant: LG ELECTRONICS INC., Seoul (KR)

(72) Inventors: Seungjin Ahn, Seoul (KR); Hyungyul Maeng, Seoul (KR)

(73) Assignee: LG ELECTRONICS INC., Seoul (KR)

(*) Notice: Subject to any disclaimer, the term of this patent is extended or adjusted under 35 U.S.C. 154(b) by 458 days.

(21) Appl. No.: 16/943,147

(22) Filed: Jul. 30, 2020

(65) Prior Publication Data

US 2021/0034062 A1  Feb. 4, 2021

(30) Foreign Application Priority Data

Jul. 31, 2019  (KR) .................. 10-2019-0093472

(51) Int. Cl.
*G05D 1/02*  (2020.01)
*A47L 11/40*  (2006.01)
*A47L 11/282*  (2006.01)

(52) U.S. Cl.
CPC .......... *G05D 1/0219* (2013.01); *A47L 11/282* (2013.01); *A47L 11/4011* (2013.01); *A47L 11/4038* (2013.01); *A47L 11/4061* (2013.01); *A47L 11/4066* (2013.01); *A47L 11/4083* (2013.01); *A47L 2201/04* (2013.01); *A47L 2201/06* (2013.01); *G05D 2201/0203* (2013.01)

(58) Field of Classification Search
CPC ............... A47L 11/282; A47L 2201/04; A47L 2201/06; A47L 9/2826; A47L 9/2805; G05D 1/2019
See application file for complete search history.

(56) References Cited

U.S. PATENT DOCUMENTS

| | | | |
|---|---|---|---|
| 8,364,309 B1 | 1/2013 | Bailey | |
| 8,961,695 B2 * | 2/2015 | Romanov | A47L 11/4011 15/340.1 |
| 2004/0181896 A1 | 9/2004 | Egawa et al. | |
| 2006/0076039 A1 | 4/2006 | Song et al. | |
| 2007/0153184 A1 | 7/2007 | Ham et al. | |

(Continued)

FOREIGN PATENT DOCUMENTS

| | | |
|---|---|---|
| CN | 102018481 A | 4/2011 |
| CN | 108774359 A | 5/2017 |

(Continued)

OTHER PUBLICATIONS

Taiwanese Office Action for Taiwanese Patent Application No. 109125852, dated Feb. 24, 2021 (15 pages).

(Continued)

*Primary Examiner* — Shay Karls
(74) *Attorney, Agent, or Firm* — Birch, Stewart, Kolasch & Birch, LLP

(57) ABSTRACT

A mobile robot rotates a spin mop to move a main body along a surface and clean the surface. A location change of the main body during its motion is analyzed to determine if the robot is traveling abnormally. If abnormal traveling is occurring, the location where it is occurring is stored and re-cleaning of the location is initiated. The location where abnormal traveling occurred may be considered in next cleaning to improve cleaning efficiency.

11 Claims, 12 Drawing Sheets

(56) References Cited

U.S. PATENT DOCUMENTS

| | | | | |
|---|---|---|---|---|
| 2016/0135655 A1* | 5/2016 | Ahn | ................... | G05D 1/0044 |
| | | | | 15/319 |
| 2019/0038101 A1 | 2/2019 | Jang et al. | | |
| 2019/0038105 A1* | 2/2019 | Park | ...................... | A47L 9/28 |
| 2019/0038106 A1* | 2/2019 | Jang | ................... | A47L 11/4041 |

FOREIGN PATENT DOCUMENTS

| | | |
|---|---|---|
| EP | 0 142 594 A1 | 5/1985 |
| EP | 3 354 180 A1 | 8/2018 |
| JP | 2005-222226 A | 8/2005 |
| KR | 10-2009-0104390 | 10/2009 |
| KR | 10-2010-0109289 | 10/2010 |
| KR | 10-2018-0008250 | 1/2018 |
| KR | 10-2018-0127709 | 11/2018 |
| KR | 10-2019-0037632 | 4/2019 |
| RU | 2 240 915 C1 | 11/2004 |
| RU | 2 344 747 C1 | 1/2009 |
| TW | 201825037 A | 7/2018 |
| WO | WO-2018054451 A1 * | 3/2018 ............. A47L 9/009 |

OTHER PUBLICATIONS

PCT Search Report for PCT International Patent Application No. PCT/KR2020/010127, dated Dec. 21, 2020 (5 pages).

* cited by examiner

MOVING ROBOT AND CONTROL METHOD THEREOF

CROSS-REFERENCE TO RELATED APPLICATION

This application claims priority under 35 USC § 119 to Korean Application No. 10-2019-0093472, filed on Jul. 31, 2019, whose entire disclosure is hereby incorporated by reference.

BACKGROUND

Field

The present disclosure relates to a moving robot and a control method thereof, and, more particularly, a moving robot capable of cleaning a surface based on rotation of a cleaning cloth installed toward the surface while traveling an area, and a control method thereof.

In general, a moving robot travels itself within an area to perform a designated operation. For example, a cleaning robot automatically cleans by suctioning foreign substances such as dust from a floor surface. In addition, a lawn mower robot mows lawn while traveling in an area, and a wet cleaning robot cleans a floor surface using a cleaning cloth. In some cases, foreign substances are suctioned from the front of the moving robot, and a cleaning cloth is installed at the rear of the moving robot to perform dry and wet cleaning. Among these moving robots, a wet cleaning robot moves an area while wiping a floor surface to perform wet cleaning.

Korea Patent Application Publication No. 10-2014-0015069 relates to a wet cloth cleaning robot which can precisely and quickly perform wet cleaning with a wet cloth by a means of a wetting and wiping step, wherein a water tank is formed in a cleaning cloth plate, and a wet cloth has a water coated part and a water wiping part so that cleaning can be performed with the wet cloth by means of the wetting and wiping step. Since the robot cleaner has a low friction with the floor surface because a predetermined pressure does not act on the floor surface, foreign substances are not effectively removed, and thus cleaning cannot be performed efficiently.

Korea Patent Application Publication No. 2019-007608 relates to a robot cleaner, which includes first and second rotating members capable of fixing a cleaner, and first and second rotational shafts for rotating each rotating member, thereby enabling the robot to move based on rotation of the rotating members. Such a conventional robot cleaner has a problem that it cannot deal with slipping that occurs during wet cleaning.

In a conventional robot cleaner, a friction against a floor surface is reduced according to the type of foreign substances present on the floor surface, so that the conventional robot cleaner may slip without cleaning the foreign substances. Even if some foreign substances are cleaned, there may be a residue of the foreign substances due to slipping. When slipping occurs, cleaning cannot be performed and a current location cannot be determined, and thus, it is not possible to control traveling normally. When it is not possible to determine the current location, a map cannot be utilized, so it is necessary to determine the current location while traveling in the entire area again or regenerate the map. Therefore, the conventional robot cleaner has a problem that it cannot remove foreign substances effectively, perform cleaning efficiently, and control traveling based on a location. Therefore, it is necessary to find a solution for this problem.

SUMMARY

An aspect of the present disclosure provides a moving robot and a control method thereof for operating a main body while rotating a cleaning cloth by means of a motor, thereby performing wet cleaning on a floor surface with an increased friction.

Another aspect of the present disclosure provides a mobile robot and a control method thereof for analyzing a set moving path and an actual traveling path to determine abnormal traveling.

Another aspect of the present disclosure provides a mobile robot and a control method thereof for determining as to deviation of a main body from a moving path to analyze a cause of abnormal traveling and determine a floor state.

Another aspect of the present disclosure provides a mobile robot and a control method thereof for storing a location where abnormal traveling occurs and performing cleaning again.

Another aspect of the present disclosure provides a mobile robot and a control method thereof for performing re-cleaning in response to contamination of a cleaning cloth by foreign substances.

Another aspect of the present disclosure provides a mobile robot and a control method thereof for outputting a notification according to abnormal traveling.

The objects of the present disclosure are not limited to the above-mentioned objects, and other objects that are not mentioned will be clearly understood by those skilled in the art from the following description.

In order to achieve the above objects, a moving robot and a control method thereof according to the present disclosure moves a main body based on rotation of a cleaning cloth by means of a motor and cleans a floor surface with the rotation of the cleaning cloth.

In the present disclosure, a set moving path and a traveling path along which the main body actually travels may be compared to determine as to deviation from the moving path.

In the present disclosure, a location change of the main body may be analyzed to determine whether the main body deviates from the moving path.

In the present disclosure, a location where abnormal traveling to deviate from the moving path occurs may be stored.

In the present disclosure, a cause of deviation may be analyzed based on data on deviation from the moving path.

In the present disclosure, a floor state may be determined based on data on deviation from the moving path.

In the present disclosure, data on deviation from the moving path may be accumulated and re-cleaning may be performed by changing a traveling pattern or the moving path.

In the present disclosure, a location where abnormal traveling occurs may be cleaned again.

In the present disclosure, there is provided a mobile robot and a control method thereof for performing re-cleaning in response to contamination of a cleaning cloth due to foreign substances.

In the present disclosure, replacement of the cleaning cloth may be requested through a notification.

In the present disclosure, a notification may be output when abnormal traveling occurs.

In the present disclosure, compensative traveling may be performed when abnormal traveling occurs.

According to an aspect of the present disclosure, there is provided a mobile robot, including: a main body configured to travel in an area; a spin mop comprising a first rotary plates and a second rotary plates, wherein a first cleaning cloth is installed at the first rotary plate and a second cleaning cloth is installed at the second rotary plate; a cleaner configured to move the main body in response to rotation of the spin mop while removing foreign substances from a floor surface; and a controller is configured to set a traveling pattern for the area and a moving path according to the traveling pattern, determine a traveling state by calculating a location change of the main body during traveling, output a notification in response to occurrence in abnormal traveling to deviate from the moving path, and set re-cleaning to clean a location where the abnormal traveling occurs.

According to another aspect of the present disclosure, there is provided a control method of a moving robot, the method including: operating a spin mop comprising a first rotary plates and a second rotary plates, wherein a first cleaning cloth is installed at the first rotary plate and a second cleaning cloth is installed at the second rotary plate; moving, by a main body, move based on a moving path according to a preset traveling pattern while removing foreign substances from a floor surface in response to rotation of the spin mop; determining a traveling state by calculating a location change of the main body; when abnormal driving to deviate from the moving path occurs, storing location information on a location where the abnormal driving occurs; outputting a notification of the abnormal traveling; and setting re-cleaning to re-clean the location where the abnormal traveling occurs.

The method may further include, when deviation from the moving path occurs during normal traveling, determine that abnormal traveling occurs due to slipping caused by foreign substances on a floor.

In the mobile robot and the control method thereof according to the present disclosure, as a location where deviation from a path occurs due to foreign substance on a floor surface is cleaned and the location of the deviation is cleaned again, it is possible to remove the foreign substances effectively.

According to the present disclosure, a cause for abnormal traveling due to deviation from a moving path may be analyzed and taken into consideration in next traveling, thereby improving cleaning efficiency.

According to the present disclosure, abnormal traveling may be analyzed and a moving path is changed in next cleaning, thereby improving cleaning efficiency.

According to the present disclosure, it is possible to determine a location that is changed in response to slipping of the main body.

According to the present disclosure, a cause for abnormal traveling may be analyzed to determine a floor state.

According to the present disclosure, a user may be allowed to recognize a floor state through a notification.

According to the present disclosure, by requesting replacement of a cleaning cloth, it is possible to secondary contamination of a floor due to contamination of the cleaning cloth.

According to the present disclosure, it is possible to request replacement of a cleaning cloth, thereby improving cleaning efficiency.

According to the present disclosure, it is possible to provide a comfortable indoor environment by improving cleaning efficiency.

DESCRIPTION OF EXEMPLARY EMBODIMENTS

Advantages and features of the present disclosure and a method of achieving the same will be clearly understood from embodiments described below in detail with reference to the accompanying drawings. However, the present disclosure is not limited to the following embodiments and may be implemented in various different forms. The embodiments are provided merely for complete disclosure of the present disclosure and to fully convey the scope of the disclosure to those of ordinary skill in the art to which the present disclosure pertains. The present disclosure is defined only by the scope of the claims. Throughout the specification, like numbers refer to like elements. A control configuration of the present disclosure may be composed of at least one processor.

Figure 1:
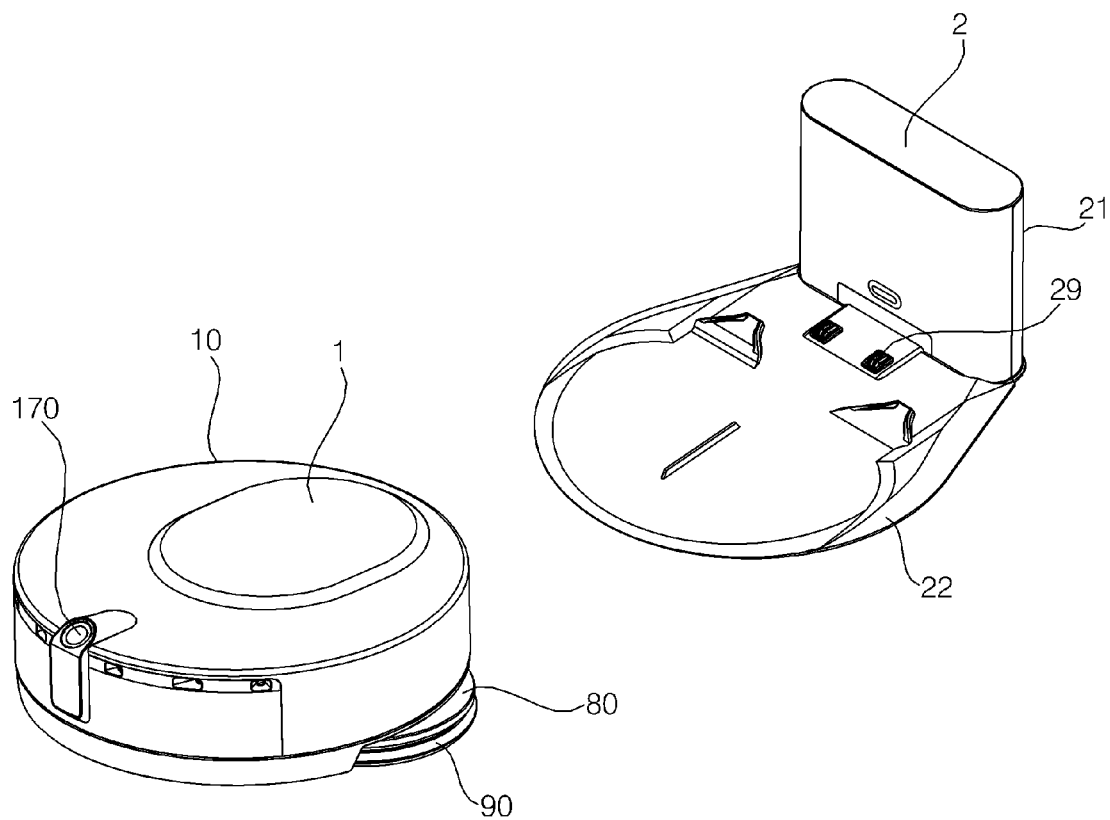
FIG. 1 is a perspective view illustrating a moving robot according to an embodiment of the present disclosure.
Figure 2A:
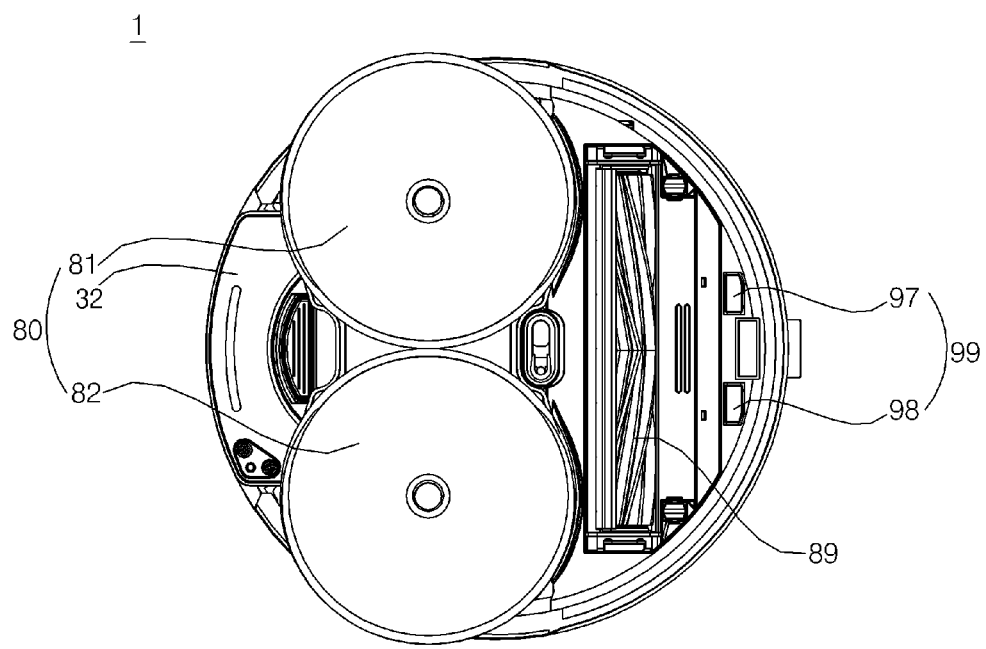
FIGS. 2(a) and 2(b) show a bottom surface of a moving robot according to an embodiment of the present disclosure.
Figure 2B:
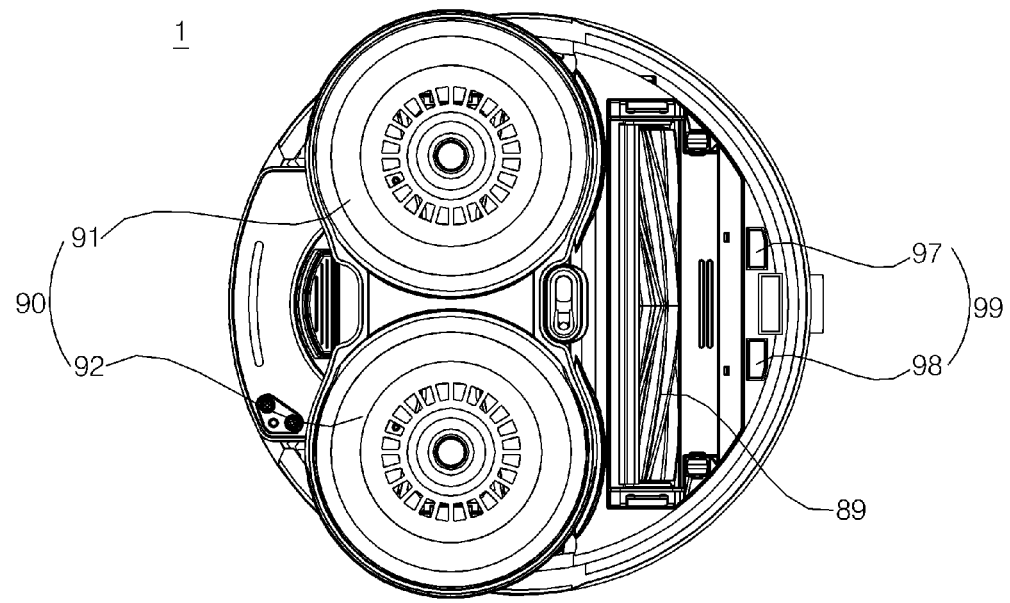

FIG. 1 is a perspective view illustrating a moving robot (or a mobile robot) according to an embodiment of the present disclosure, and FIGS. 2(a) and 2(b) are diagrams illustrating a bottom surface of a moving robot according to an embodiment of the present disclosure.

Referring to FIGS. 1, 2(a), and 2(b), a moving robot 1 according to an embodiment of the present disclosure moves within an area and removes foreign substances from a surface (e.g., a floor) of the area during traveling.

In addition, the moving robot 1 stores charged power, supplied from a charging stand 2, in a battery (not shown) to travel an area.

The moving robot 1 includes a main body 10 for performing a designated operation, an obstacle detector (not shown) disposed at a front surface of the main body 10 to sense an obstacle, and an image acquirer 170 for capturing an image. The main body 10 includes a casing which forms a space to accommodate components of the main body 10, which forms an exterior of the main body and an interior space to accommodate components of the main body 10; a spin mop 80 capable of rotating, a roller 89 for assisting movement of the main body 10 and cleaning, and a charging terminal 99 through which charging power is received from the charging stand 2.

In addition, the moving robot 1 may further include a water tank 32 disposed inside the main body 10 to store water, a pump (not shown) for supplying water stored in the water tank to the spin mop 80, and a connecting hose (not shown) that forms a connecting flow path between the pump and the water tank 32 or between the pump and the spin mop 80. In some cases, a valve for controlling water supply may be further provided.

The spin mop 80 is disposed at the casing and is formed toward a bottom surface so that the cleaning cloth is detachable. The spin mop is symmetrically disposed at a lower side of the main body 10. The spin mop 80 is disposed in front of the water tank 32.

The spin mop 80 moves using a frictional force with the bottom surface, the frictional force which is generated in response to rotation in a clockwise or counterclockwise direction as viewed from above, and the spin mop cleans a floor. The spin mop 80 is provided to rotate around a rotational axis that extends in a substantially vertical direction.

The spin mop 80 includes a first rotary plate 81 and a second rotary plate 82 so that the body 10 moves along a floor of an area through rotation.

The main body 10 travels forward, backward, leftward, and rightward as the first and second rotary plates 81 and 82 of the spin mop 80 rotate around the rotational axis. In addition, as the first rotary plate and the second rotary plate rotate, foreign substances are removed from a bottom surface by an attached cleaning cloth and the main body 10 performs perform wet cleaning.

The main body 10 may include a driving unit (not shown) for driving the first rotary plate 81 and the second rotary plate 82. The driving unit may include at least one motor.

Lower surfaces of the spin mop 80 may be arranged to be inclined, respectively.

A lower surface of the first rotary plate 81 forms a slope downward in the left direction as a whole. A lower surface of the second rotary plate 82 forms a slope downward in the right direction as a whole. The lower surface of the first rotary plate 81 forms the lowest point on the left side. The lower surface of the first rotary plate 81 forms the highest point on the right side. The lower surface of the second rotary plate 82 forms the lowest point on the right side. The lower surface of the second rotary plate 82 forms the highest point on the left side. For example, as the first rotary plate 81 rotates at a first rotational speed in a first direction and the second rotary plate 82 rotates at the first rotational speed in a second direction, the main body 10 may move forward and backward. In addition, the main body 10 may move leftward and rightward by setting different rotational speeds for the first and second rotary plates or by setting the same rotational direction for the first and second rotary plates.

In addition, the main body 10 may further include a tilting frame (not shown). The tilting frame is disposed to be tiltable within a predetermined angular range with respect to the spin mop 80. The tilting frame allows a tilt angle to be changed according to a floor condition. The tilting frame may perform the function of suspension (reducing up and down vibration at the same time as supporting the weight) of the spin mop 80.

The roller 89 rotates during traveling, and collects foreign substances from the bottom surface and stores the collected foreign substances in a dust container (not shown).

A control panel including an operator (not shown) that receives various commands for controlling the moving robot 1 from a user may be provided on an upper surface of the casing.

In addition, an image acquirer 170 and an obstacle detector (not shown) are disposed at a front surface or an upper surface of the main body.

The obstacle detector senses an obstacle located in a direction of travel or around the main body 10.

The image acquirer 170 captures an image of an indoor area. Based on the image captured through the image acquirer, it is possible not just to sense an obstacle around the main body but also to monitor the indoor area.

The image acquirer 170 is disposed at a predetermined angle toward a forward and upward direction to photograph an area forward and upward from the moving robot. In addition, the image acquirer is capable of 360-degree photographing.

The image acquirer may further include an additional camera for photographing a front area. The image acquirer may be disposed at an upper side of the main body 10 to face the ceiling, and in some cases, a plurality of cameras may be provided. In addition, the image acquirer may further include an additional camera for photographing a bottom surface.

The moving robot 1 may further include a location obtaining means (not shown) for obtaining current location information. In some embodiments, the moving robot 1 may determine the current location by including a GPS and/or a UWB. Additionally or alternatively, the moving robot 1 may determine the current location using an image.

The main body 10 may include a rechargeable battery (not shown), and as the charging terminal 99 of the battery may be connected to a utility power source (for example, a power outlet at home) or the main body 10 is docked with the charging stand 2 connected to the utility power source, the charging terminal may be electrically connected to the utility power source through contact with a terminal 29 of the charging stand, so that the battery can be charged by the charging power being supplied to the main body 10.

The electric components constituting the moving robot 1 may be supplied with power from the battery, and thus, in the state in which the battery is charged, the moving robot 1 is capable of traveling by itself while being electrically disconnected from the utility power source.

Hereinafter, the moving robot 1 will be described with an example of a moving robot for wet cleaning, but the present disclosure is not limited thereto, and aspects of the current disclosure may be applied to any type of robot without limitation. For example, the disclosed robot may be capable of sensing sound while autonomously traveling an area can be applied.

The spin mop 80 includes the first rotary plate 81 and the second rotary plate 82. Cleaning cloths 91 and 92 and 90 may be attached to the first rotary plate 81 and the second rotary plate 82, respectively.

The spin mop 80 is configured such that the cleaning cloths can be detachably attached. The spin mop 80 may include mounting members for attaching the cleaning cloths to the first rotary plate 81 and the second rotary plate 82, respectively. For example, a mounting member, such as Velcro® and a fitting member, may be provided in the spin mop 80 so that a cleaning cloth is attached and fixed. In addition, the spin mop 80 may further include a cleaning cloth frame (not shown) as an additional auxiliary means for fixing the cleaning cloths to the first rotary plate 81 and the second rotary plate 82.

The cleaning cloth 90 absorbs water and removes foreign substances through friction with the bottom surface. The cleaning cloth 90 may be made of a microfiber or fabric pad, and a material such as cotton fabric or blended cotton fabric may be used. Any type of cleaning medium may be used as cleaning cloth 90. In some embodiments, cleaning cloth 90 may contain moisture at a certain proportion or more and/or may have a predetermined fabric density.

The cleaning cloth 90 is supplied with water from the water tank 32 through the connecting flow path. Water may be supplied from the water tank 32 to the cleaning cloth 90 through the connection passage (not shown) through the driving of the pump.

The cleaning cloth 90 may be formed in a circular shape. The shape of the cleaning cloth 90 is not limited to the drawings and may be formed in a square, a polygon, or the like, but it is preferable that the cleaning cloth has a shape that does not interfere with rotation of the first and second rotary plates by taking into account the rotation of the first and second rotary plates. In addition, the shape of the cleaning cloth may be changed into a circle by the cleaning cloth frame that is provided separately.

The spin mop 80 is configured such that once the cleaning cloth 90 is installed, the cleaning cloth comes into contact with the bottom surface. The spin mop 80 is configured in consideration of a thickness of the cleaning cloth such that a distance between the first rotary plate and the second rotary plate is changed according to the thickness of the cleaning cloth.

The spin mop 80 further includes a member which adjusts a distance between the casing and a rotary plate so that the cleaning cloth and the bottom surface come into contact with each other, and which causes pressure to be applied on the first and second rotary plates toward the bottom surface.

Figure 3:
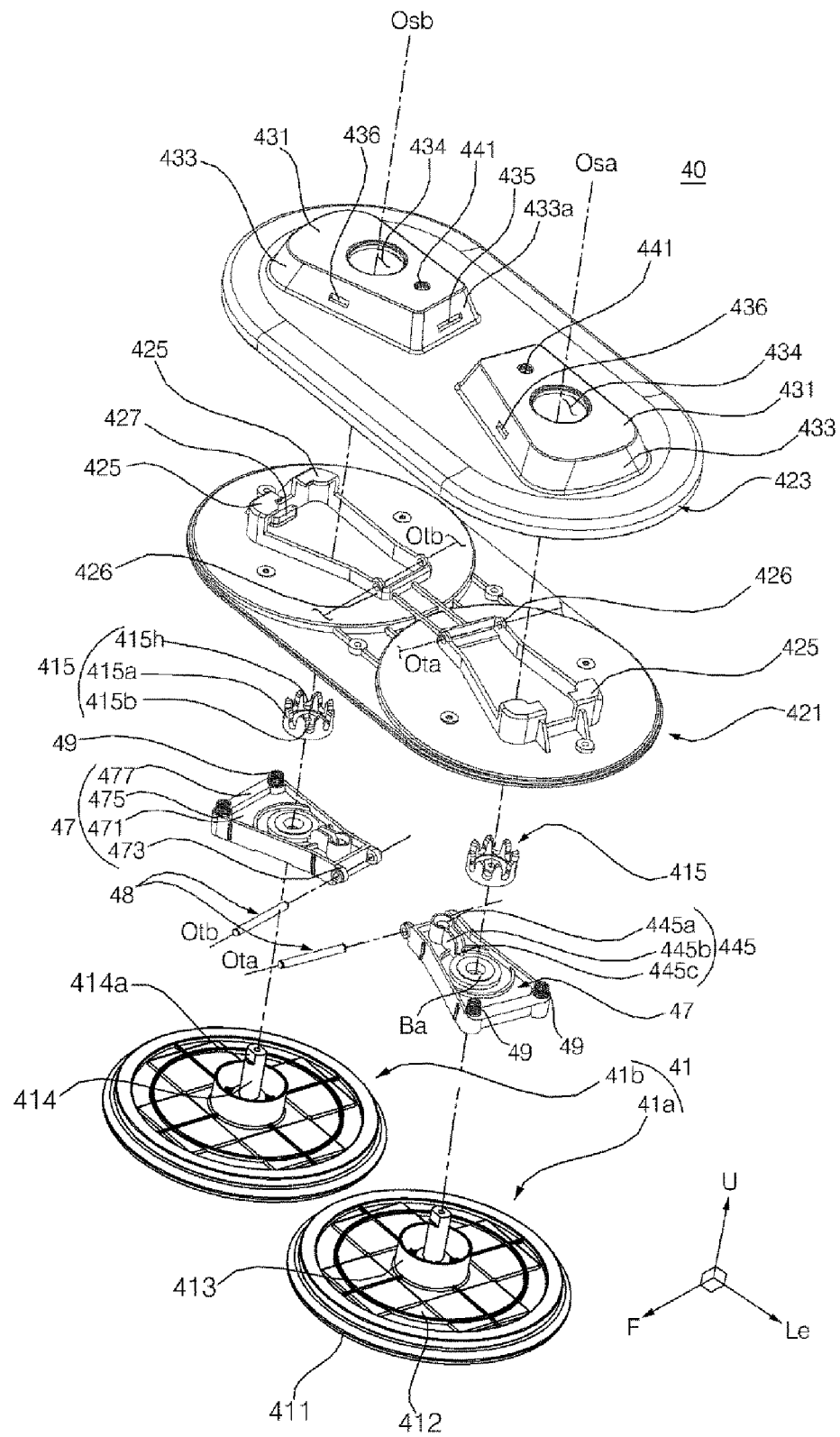
FIG. 3 is an exploded perspective view of a mop module including a spin mop of FIGS. 2(a) and 2(b).

FIG. 3 is an exploded perspective view of a mop module including a spin mop of the moving robot of FIGS. 2(*a*) and 2(*b*). With reference to FIGS. 2(*a*), 2(*b*) and 3, the spin mop 80 is included in a mop module 40. The mop module 40 includes at least one cleaning cloth 90, 41, 411 provided to mop the bottom surface while rotating, and at least one spin mop 80 provided to come in contact with the bottom while rotating in a clockwise direction or in a counter-clockwise direction as viewed from above.

The spin mop includes a first rotary plate 81, 41*a* and a second rotary plate 82, 41*b*. In this embodiment, the spin mop 80 is provided to rotate about a rotational axis Osa, Osb that extends in a substantially vertical direction.

The mop module 40 is disposed below the main body 10. The mop module 40 is disposed behind a collecting module.

A first rotary plate 41*a* and a second rotary plate 41*b* each include a cleaning cloth 411, a rotary plate 412, and a spin shaft 414. The first rotary plate 41*a* and the second rotary plate 41*b* each include a water supply receiving unit 413. The first rotary plate 41*a* and the second rotary plate 41*b* each include a driven joint 415. The cleaning cloth 411, the rotary plate 412, a spin shaft 414, the water receiving portion 413, and the driven joint 415, which will be described later, may be understood as components included in each of the first rotary plate 41*a* and the second rotary plate 41*b*.

The main body 10 and the mop module 40 may be detachably coupled to each other.

The state in which the main body 10 and the mop module 40 are coupled to each other may be referred to as a "coupled state." In addition, the state in which the main body 10 and the mop module 40 are separated from each other may be referred to as a "separated state." The moving robot 1 includes a detachment module (not shown) that detachably engages the mop module with the main body. The detachment module may disengage the mop module 40 from the main body 10 in the coupled state. The detachment module operates such that the mop module 40 and the main body 10 are detached from and attached to each other. The detachment module may cause the main module 10 to be engaged with the main module 10 in the separated state. The detachment module may be disposed across a gap between the water tank 32 and a battery Bt.

The moving robot 1 includes a base (not shown) that forms a lower surface of the main body 10. The base forms the lower surface, the front surface, the rear surface, the left surface, and the right surface of the main body 10. The mop module 40 is coupled to the base. The collecting module (not shown) is coupled to the base. The controller 110 and the battery Bt are disposed in an inner space formed by the case 31 and the base.

The moving robot 1 includes a module housing 42 that forms the exterior of the mop module 40. The module housing 42 is disposed below the body 10.

The mop module 40 includes a pair of main body seating portions (not shown) that are spaced apart from each other. The pair of main body seating portions corresponds to a pair of spin mops 41*a* and 41*b*. The pair of main body seating portions correspond to a pair of module seating portions (not shown).

A module seating portion forms a joint hole (not shown) in which at least a portion of a driving joint (not shown) is exposed. The driving joint (not shown) may be placed by passing through the joint hole. The driving joint is coupled to the driven joint 415 to transmit a driving force of the driving unit (not shown) to the spin mop.

A surface of one of the module seating portion and the body seating portion is provided with a protruding engaging portion (not shown), and a surface of the other is provided with an engaged portion 435, 436 that is recessed to engage with the engaging portion in the coupled state.

The main body seating portion 43 includes a top part 431 forming a top surface. The top part 431 faces upward. The top part 431 may be formed horizontally. The top part 431 is disposed above a peripheral part 433.

The main body seating portion 43 includes the peripheral part 433 that is disposed along a circumference of the top part 431. The peripheral part 433 forms a slope that extends between the top surface of the module housing 42 and the top part 431. The peripheral part 433 has an inclination that increases from the top surface of the module housing 42 to the top part 431. The peripheral part 433 is disposed surrounding the top part 431.

The main body seating portion 43 includes an engaged surface 433*a* that contacts an engaging surface 363*a* in the coupled state. The pair of main body seating portions 43 includes a pair of engaged surfaces 433*a*. The pair of enraged surfaces 433*a* are disposed in the left and right sides to obliquely face each other. The pair of engaged surface 433*a* is disposed between the pair of main body seating portions 43. An engaged surface 433*a* is disposed in an area of the periphery part 433 of one main body seating portion 43, the area which is close to the other main body seating portion 43. The engaged surface 433a is disposed in an area relatively close to a central vertical plane Po in the peripheral part 433. The engaged surface 433a constitutes a portion of the peripheral part 433.

The main body seating portion 43 has a driving hole 434 formed therein, the hole through which at least a portion of the driven joint 415 is exposed. The driving hole 434 is formed in the top part 431. In the coupled state, the driving joint may be inserted into the driving hole 434 and connected to the driven joint 415.

The mop module 40 includes at least one spin mop 80. The at least one spin mop 80 may include a pair of spin mops 80. The pair of spin mops 80 is provided symmetrically left and right with respect to a virtual central vertical plane. The first rotary plate 41a and the second rotary plate 41b are disposed symmetrically to each other.

The lower surface of the first rotary plate 41a and the lower surface of the second rotary plate 41b are disposed to be inclined, respectively. The lower surface of the first rotary plate 41a forms a slope that is downward in the left direction as a whole. The lower surface of the second rotary plate 41b forms a slope that is downward in the right direction as a whole.

The lower surface of the first rotary plate 41a forms the lowest point on the left side. The lower surface of the first rotary plate 41a forms the highest point on the right side. The lower surface of the second rotary plate 41b forms the lowest point on the right side. The lower surface of the second rotary plate 41b forms the highest point on the left side. Movement of the moving robot 1 is performed by a friction with the ground, which is generated by the mop module 40.

The mop module 40 may generate a "forward moving friction" to move the main body 10 forward, or a "rearward moving friction" to move the main body rearward. The mop module 40 may generate a "left moment friction" to rotate the main body 10 to the left, or a "right moment friction" to rotate the main body 10 to the right. The mop module 40 may generate a friction by combining any one of the forward movement friction and the rear movement friction and any one of the left moment friction and the right moment friction.

In order to generate the forward moving frictional force, the mop module 40 may rotate the first rotary plate 41a at a predetermined rpm R1 in a first forward direction and the second rotary plate 41b at the predetermined rpm R1 in a second forward direction.

In order to generate the rearward moving friction, the mop module 40 may rotate the first rotary plate 41a at a predetermined rpm in a first reverse direction and rotates the second rotary plate 41b at the predetermined rpm R2 in a second reverse direction.

The spin mop 80 includes the driven joint 415 that is rotated in engagement with a driving joint. The driving joint is exposed to the outside of the main body 10. At least a portion of the driven joint 415 is exposed to the outside of the mop module 40.

In the separated state, the driving joint and the driven joint 415 are separated from each other. In the coupled state, the driving joint and the driven joint 415 are engaged.

One of the driving joint and the driven joint 415 includes a plurality of driving protrusions (not shown) disposed in a circumferential direction about a rotational axis of the one joint, and the other joint has a plurality of driving grooves 415 formed therein, which is disposed in a circumferential direction about a rotational axis of the other joint.

The plurality of driving protrusions are spaced apart from each other at a predetermined interval. The plurality of driving grooves 415h are spaced apart from each other at a predetermined interval. In the coupled state, the driving protrusions are provided to be inserted into the driving grooves 415h.

One of the driving joint and the driven joint 415 includes a plurality of driving protrusions 65a spaced apart from each other in a circumferential direction about a rotation axes of the one joint, and the other joint includes a plurality of opposing protrusions 415a spaced apart from each other in a circumferential direction about a rotational axis of the other joint. The plurality of opposing protrusions 415a protrude in the aforementioned direction.

Protruding ends of the opposite protrusions 415a are formed to be rounded. The protruding ends of the opposing protrusions 415a are formed to be rounded along a direction in which the plurality of opposing protrusions 415a is arranged. The protruding ends of the opposing protrusions 415a each have a corner portion rounded toward the opposing protrusions 415a with respect to a central axis of a protruding direction. Accordingly, when the separated state is changed to the coupled state, the driving protrusions 65a may move smoothly along the rounded protruding ends of the opposite protrusions 415a and inserted into the driving grooves 415h.

In this embodiment, the driving joint includes the driving protrusions 65a, and the driven joint 415 forms the driving grooves 415h. In this embodiment, the driven joint 415 includes the opposing protrusions 415a. The following description is based on this embodiment.

The driven joint 415 is fixed to an upper end of the spin shaft 414. The driven joint 415 includes a driven shaft portion 415b fixed to the spin shaft. The driven joint 415 includes the opposite protrusions 415a protruding from the driven shaft portion 415b. The opposite protrusions 415a protrudes from the driven shaft portion 415b in one of up and down directions, which is toward the driving joint.

The module housing 42 connects the pair of spin mops 41a, 41b. By means of the module housing 42, the pair of spin mop 41a, 41b are separated together from the body 10 and coupled together to the body 10. The main body seating portion 43 is disposed above the module housing 42. The spin mop 80 may be supported to be rotatable within the module housing 42. The spin mop 80 may be placed by passing through the module housing 42.

The module housing 42 may include an upper cover 421 forming an upper part, and a lower cover 423 forming a lower part. The upper cover 421 and the lower cover 423 are coupled to each other. The upper cover 421 and the lower cover 423 form an inner space for accommodating a portion of the spin mop 80.

A suspension unit 47, 48, 49 may be disposed in the module housing 42. The suspension unit 47, 48 and 49 may be disposed in the inner space formed by the upper cover 421 and the lower cover 423. The suspension unit 47, 48, 49 supports the spin shaft 414 to be able to move upward and downward within a predetermined range. The suspension units 47, 48, 49 according to this embodiment include a tilting frame 47, a tilting shaft 48 and an elastic member 49.

The module housing 42 may include a limit that limits a rotational range of the tilting frame 47.

The limit may include a lower limit 427 that limits a downward rotational range of the tilting frame 47. The lower limit 427 may be disposed in the module housing 42. The lower limit 427 is provided to contact the lower limit contacting portion 477 in a state in which the tilting frame 47 is rotated to the maximum in the downward direction. In a state in which the moving robot 1 is properly disposed on an external horizontal surface, the lower limit contact portion 477 is spaced apart from the lower limit 427. In a state in which there is no force pushing from the lower surface of the spin mop 80 in the upward direction, the tilting frame 47 is rotated by a maximum angle, the lower limit contacting portion 477 comes into contact with the lower limit 427, and a tilt angle becomes the largest.

The limit may include an upper limit (not shown) that limits an upward rotational range of the tilting frame 47. In this embodiment, the upward rotational range of the tilting frame 47 may be limited by airtight contact between the driving joint and the driven joint 415. In a state in which the moving robot 1 is properly disposed on an external horizontal surface, the driven joint 415 is in close contact with the driving joint, and a tilt angle becomes the smallest.

The module housing 42 includes a second support 425 that fixes an end of the elastic member 49. When the tilting frame 47 is rotated, the elastic member 49 is elastically deformed or elastically restored by a first support 475 fixed to the tilting frame 47 and the second support 425 fixed to the module housing 42.

The module housing 42 includes a tilting shaft support 426 that supports the tilting shaft 48. The tilting shaft support 426 supports both ends of the tilting shaft 48.

The mop module 40 includes a module water supply unit 44 that guides water introduced from the water tank 32 to the spin mop 80 in the coupled state. The module water supply part 44 guides water from an upper side to a lower side. A pair of module water supply units (not shown) corresponding to the pair of spin mops 41a, 41b may be provided.

The module water supply unit (not shown) includes a water supply corresponding unit 441 that receives water from the water tank 32. The water supply corresponding part 441 is provided to be connected to the water supply connecting unit (not shown).

The module water supply unit 44 includes a water supply guide unit 445 that guides the water introduced into the water supply corresponding unit 441 to the spin mop 80. The water introduced into the water supply correspondence unit 441 flows into the water supply guide unit 445 through a water supply transmitting unit 443.

The water supply guide unit 445 is disposed at the tilting frame 47. The water supply guide unit 445 is fixed to a frame base 471. Water flows into a space formed by the water supply guide unit 445 through the water supply corresponding unit 441 and the water supply transmitting unit 443. Water scattering is minimized by the water supply guide unit 445 so that all water can flow into a water supply receiving unit 413.

The water supply guide unit 445 may include an inlet 445a that forms a space recessed from an upper side to a lower side. The inlet 445a may accommodate a lower end of the water supply transmitting unit 443. The inlet 445a may form a space in which the upper side is opened. Water that has passed through the water supply transmitting unit 443 is introduced through the upper opening of the space of the inlet 445a. One side of the space of the inlet 445a is connected to a flow path that forms a flow path portion 445b.

The water supply guide unit 445 may include the flow path portion 445b that connects the inlet 445a and an outlet 445c. One end of the flow path portion 445b is connected to the inlet 445a, and the other end of the flow path portion 445b is connected to the outlet 445c. A space formed by the flow path portion 445b serves as a water flow path. The space of the flow path portion 445b is connected to the space of the inlet 445a. The flow path portion 445b may be formed in a channel shape in which the upper side is opened. The flow path portion 445b may have an inclination that gradually decreases in height from the inlet 445a to the outlet 445c.

The water supply guide unit 445 may include the outlet 445c that discharges water into a water supply space of the water supply receiving unit 413. A lower end of the outlet 445c may be disposed in the water supply space. The outlet 445c forms a hole that is connected from an inner space of the module housing 42 to a space above the rotary plate 412. The hole of the outlet 445c connects the two spaces vertically. The outlet 445c forms a hole that penetrates the tilting frame 47 vertically. The space of the flow path portion 445b is connected to the hole of the outlet 445c. The lower end of the outlet 445c may be disposed in the water supply space of the water supply receiving unit 413.

The tilting frame 47 is connected to the module housing 42 via the tilting shaft 48. The tilting frame 47 rotatably supports the spin shaft 414.

The tilting frame 47 is provided to be rotatable within a predetermined range about a tilting rotational axis Ota and Otb. The tilting rotational axis Ota, Otb extends in a direction transverse to a rotational axis Osa, Osb of the spin shaft 414. The tilting shaft 48 is disposed on the tilting rotational axis Ota, Otb. A left tilting frame 47 is provided to be rotatable within a predetermined range about a tilting rotational axis Ota. A right tilting frame 47 is provided to be rotatable within a predetermined range about a tilting rotational axis Otb.

The tilting frame 47 is disposed to be tiltable within a predetermined angular range with respect to the mop module 40. The tilting frame 47 allows a tilt angle to be changed according to a floor condition. The tilting frame 47 may perform a function of suspension of the spin mop 80 (to support the weight and reduce up and down vibration).

The tilting frame 47 includes the frame base 471 that forms a lower surface. The spin shaft 414 is disposed by passing through the frame base 471 vertically. The frame base 471 may be formed in a plate shape that forms a vertical thickness. The tilting shaft 48 rotatably connects the module housing 42 and the frame base 471.

A bearing Ba may be provided between a rotational shaft support 473 and the spin shaft 414. The bearing Ba may include a first bearing disposed at a lower side and a second bearing disposed at an upper side.

A lower end of the rotational shaft support 473 is inserted into the water supply space of the water supply receiving unit 413. An inner circumferential surface of the rotational shaft support 473 supports the spin shaft 414.

The tilting frame 47 includes the first support 475 that supports one end of the elastic member 49. The other end of the elastic member 49 is supported by the second support 425 disposed in the module housing 42. When the tilting frame 47 is tilted on the tilting shaft 48, a location of the first support 475 is changed and a length of the elastic member 49 is changed.

The first support 475 is fixed to the tilting frame 47. The first support 475 is disposed at a left side of the left tilting frame 47. The first support 475 is disposed at a right side of the right tilting frame 47. The second support 425 is disposed in a left region of the first rotary plate 41a. The second support 425 is disposed in a right region of the second rotary plate 41b.

The first support 475 is fixed to the tilting frame 47. The first support 475 is tilted together with the tilting frame 47 upon a tilting operation of the tilting frame 47. A distance between the first support 475 and the second support 425 is the smallest when the tilt angle is minimized, and the distance between the first support 475 and the second support 425 is the largest when the tilt angle is maximized. In a state where the inclination angle is minimized, the elastic member 49 is elastically deformed, thereby providing a restoring force.

The tilting frame 47 includes the lower limit contact 477 that is provided to be in contact with the lower limit 427. A lower surface of the lower limit contact portion 477 may be provided to be able to contact an upper surface of the lower limit 427.

The tilting shaft 48 is disposed in the module housing 42. The tilting shaft 48 serves as the rotational axis of the tilting frame 47. The tilting shaft 48 may be disposed to extend in a direction perpendicular to an inclined direction of the spin mop 80. The tilting shaft 48 may be disposed to extend in a horizontal direction. In this embodiment, the tilting shaft 48 is disposed to extend in a direction inclined by an acute angle from a forward-backward direction.

The elastic member 49 applies an elastic force to the tilting frame 47. An elastic force is applied to the tilting frame 47 so that the tilt angle of the lower surface of the spin mop 80 relative to the horizontal surface increases.

The elastic member 49 is provided to extend when the tilting frame 47 is rotated downward, and to contract when the tilt frame is rotated upward. The elastic member 49 allows the tilting frame 47 to operate in a shock absorbing manner (an elastic manner). The elastic member 49 applies a moment force to the tilting frame 47 in a direction in which the tilt angle increases.

The spin mop 80 includes a rotary plate 81, 82, 412 provided to be rotated below the body 10. The rotary plate 412 may be formed as a circular plate-shaped member about the spin shaft 414. The cleaning cloth 411 is fixed to the lower surface of the rotary plate 412. The rotary plate 412 rotates the cleaning cloth 411. The spin shaft 414 is fixed to the center of the rotary plate 412.

The rotary plate 412 includes a second rotary plate 412 spaced apart from the first rotary plate 81, 412. A lower surface of the first rotary plate 412 may form a downward slope in a left forward direction, and a lower surface of the second rotary plate 82, 412 may form a downward slope in a right forward direction.

The rotary plate 412 includes a cleaning cloth fixing part that fixes the cleaning cloth 90, 411. The cleaning cloth fixing part may fix the cleaning cloth 411 detachably. The cleaning cloth fixing part 4 may be Velcro or the like, which is disposed at the lower surface of the rotary plate 412. The cleaning cloth fixing part may be a hook or the like, which is disposed at an edge of the rotary plate 412.

A water supply hole penetrating the rotary plate 412 in the up and down directions is formed. The water supply hole connects the water supply space and the lower side of the rotary plate 412. Through the water supply hole, water in the water supply space flows to the lower side of the rotary plate 412. Through the water supply hole, water in the water supply space flows to the cleaning cloth 411. The water supply hole is disposed at the center of the rotary plate 412. The water supply hole is disposed at a location where the spin shaft 414 is avoided. Specifically, the water supply hole is disposed at a location not overlapping the spin shaft 414 in the vertical direction.

The rotary plate 412 may form a plurality of water supply holes. A connecting part is disposed between the plurality of water supply holes. The connecting part connects a portion corresponding to a centrifugal direction of the rotary plate 412 with respect to the water supply hole and a portion corresponding to an opposite centrifugal direction of the rotary plate 412 with respect to the water supply holes. Here, the centrifugal direction refers to a direction away from the spin shaft 414, and the opposite centrifugal direction XI refers to a direction closer to the spin shaft 414.

The plurality of water supply holes may be spaced apart from each other along a circumferential direction of the spin shaft 414. The plurality of water supply holes may be arranged to be spaced apart from each other at a predetermined interval. A plurality of connecting parts may be arranged to be spaced apart from each other along the circumferential direction of the spin shaft 414. The water supply holes each are disposed between the plurality of connecting parts.

The rotary plate 412 includes an inclined portion disposed at a lower end of the spin shaft 414. Water in the water supply space Sw flows down along the inclined portion by gravity. The inclined portion is formed along a circumference of a lower end of the spin shaft 414. The inclined portion forms a downward inclination in the opposite centrifugal direction XI. The inclined portion may form a lower surface of the water supply holes.

The spin mop 80 includes the cleaning cloth 411 that is coupled to the lower side of the rotary plate 412 to thereby contact the floor. The cleaning cloth 411 may be replaceable disposed at the rotary plate 412. The cleaning cloth 411 may be detachably fixed to the rotary plate 412 using Velcro® or a hook. The cleaning cloth 411 may be composed of the cleaning cloth 411 alone or may be composed of the cleaning cloth 411 and a spacer (not shown). The cleaning cloth 411 is a portion that directly contacts the floor to clean.

The spin mop 80 includes the spin shaft 414 that rotates the rotary plate 412. The spin shaft 414 is fixed to the rotary plate 412 and transmits a rotational force of the mop driving unit to the rotary plate 412. The spin shaft 414 is connected to an upper side of the rotary plate 412. The spin shaft 414 is disposed at the center of the upper side of the rotary plate 412. The spin shaft 414 is fixed to the rotational center Osa, Osb (rotational axis) of the rotary plate 412. The spin shaft 414 includes a joint fixing portion 414a that fixes the driven joint 415. The joint fixing portion 414a is disposed at an upper end of the spin shaft 414.

The mop module 40 includes the water supply receiving unit 413 that is disposed at the upper side of the rotary plate 412 to receive water. The water supply receiving unit 413 forms the water supply space Sw in which water is received. The water supply receiving unit 413 forms the water supply space SW that is spaced apart from the spin shaft 414 while surrounding the circumference of the spin shaft 414. The water supply receiving unit 413 allows water supplied to the upper side of the rotary plate 412 to be collected in the water supply space Sw until the water passes through the water supply holes. The water supply space Sw is disposed at the center of the upper side of the rotary plate 412. The water supply space Sw has a cylindrical volume as a whole. The upper side of the water supply space Sw is opened. Water flows into the water supply space Sw through the upper side of the water supply space Sw.

The water supply receiving unit 413 protrudes upward from the rotary plate 412. The water supply receiving unit 413 extends along the circumferential direction of the spin shaft 414. The water receiving part 413 may be formed in a ring-type rib shape. The water supply holes are provided in an inner lower surface of the water supply receiving unit 413. The water supply receiving unit 413 is spaced apart from the spin shaft 414. A lower end of the water supply receiving unit 413 is fixed to the rotary plate 412. An upper end of the water receiving container 413 has a free end.

Figure 4:
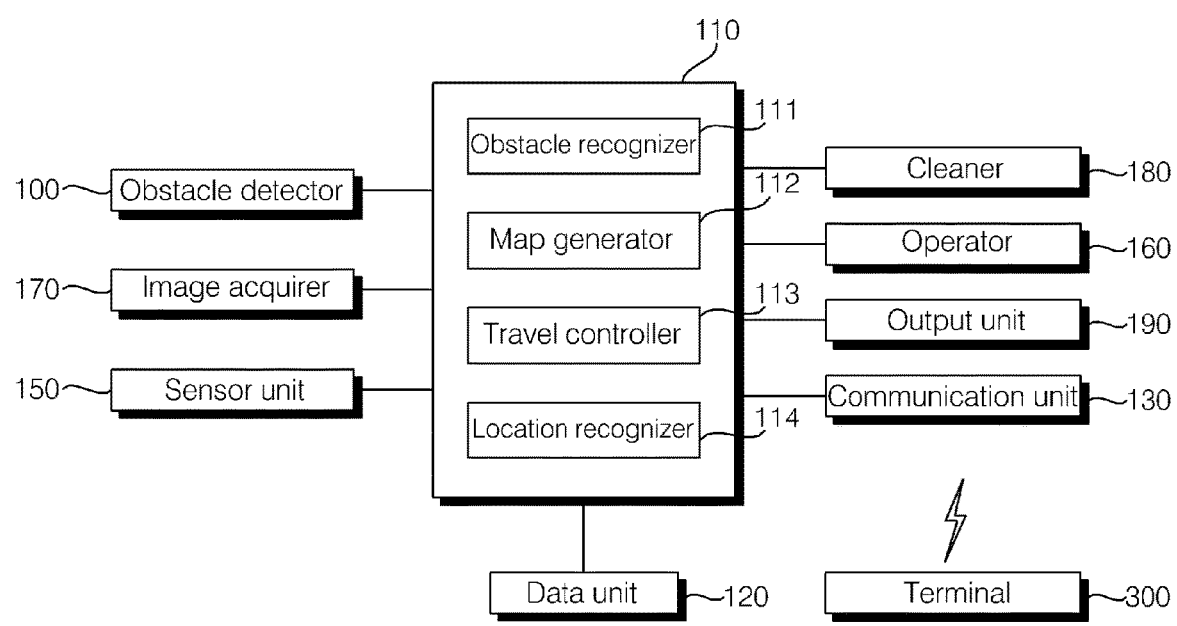
FIG. 4 is a block diagram illustrating configuration of a moving robot according to an embodiment of the present disclosure.

FIG. 4 is a block diagram illustrating configuration of a moving robot according to an embodiment of the present disclosure. With additional reference to FIG. 4, the moving robot 1 includes a cleaner 180, a data unit 120, an obstacle detector 100, an image acquirer 170, a sensor unit 150, and a communication unit 130, an operator 160, an output unit 190, and a controller 110 for controlling overall operations. The operator 160 includes an input means such as at least one button, a switch, or a touch pad to receive a user command. The operator may be provided at the top part of the main body 10 as described above.

The output unit 190 has a display such as an LED and an LCD, and displays an operation mode, reservation information, a battery status, an operating state, an error status, and the like of the moving robot 1. In addition, the output unit 190 is provided with a speaker or a buzzer, and outputs predetermined sound effect, warning sound, or voice guidance corresponding to an operation mode, reservation information, a battery status, an operating state, an error status, and the like.

In some cases, the moving robot may further include an audio input unit (not shown). The audio input unit includes at least one microphone, and receives sound generated in a surrounding area or region within a certain distance from the main body 10. The audio input unit may further include a signal processor (not shown) that filters, amplifies, and converts input sound. The moving robot 1 may operate by recognizing a voice command input through the audio input unit.

The data unit 120 stores an acquired image input from the image acquirer 170, reference data used for an obstacle recognizer 111 to determine an obstacle, and obstacle information on a sensed obstacle.

The data unit 120 stores obstacle data for determining a type of obstacle, image data in which a captured image is stored, and map data regarding an area. The map data includes obstacle information, and various types of maps for travelable areas to be searched by the moving robot are stored. The data unit 120 may include an image captured through the image acquirer, for example, a still image, a video, and a panoramic image. In addition, the data unit 120 stores control data for controlling an operation of the moving robot, data according to a cleaning mode of the moving robot, and a sensing signal such as ultrasound/laser sensed by the sensor unit 150.

In addition, the data unit 120 may store data readable by a microprocessor, and may include Hard Disk Drive (HDD), Solid State Disk (SSD), Silicon Disk Drive (SDD), Read-Only Memory (ROM), Random-Access Memory (RAM), an optical data storage device, etc.

The communication unit 130 communicates with the terminal 300 in a wireless communication method. Further, the communication unit 130 may be connected to an Internet network over a network at home and communicate with an external server (not shown) or a terminal 300 for controlling a moving robot.

The communication unit 130 transmits a generated map to the terminal 300, receives a cleaning command from the terminal, and transmits data on an operating state and a cleaning state of the moving robot to the terminal. In addition, the communication unit 130 may transmit information on an obstacle detected during traveling to the terminal 300 or the server. The communication unit 130 transmits and receives data, including communication modules such as short-range wireless communication such as ZigBee, Bluetooth, Wi-Fi, and WiBro.

The communication unit 130 may communicate with the charging stand 2 and receive a charging signal for returning to the charging stand or a guide signal for docking with the charging stand. The moving robot 1 searches for the charging stand based on a signal received through the communication unit 130 and is docked with the charging stand.

On the other hand, the terminal 300 is a device in which a communication module is installed to access a network and a program or application for controlling the moving robot is installed, and a computer, a laptop, a smartphone, a PDA, a tablet PC, and the like may be used as the terminal. In addition, a wearable device such as a smart watch may be used as the terminal.

The terminal 300 may output a predetermined warning sound or display a received image according to data received from the moving robot 1. The terminal 300 may receive data on the moving robot 1, monitor an operating state of the moving robot, and control the moving robot 1 using a control command. The terminal 300 may be directly connected to the moving robot 1 on a one-to-one basis, and may also be connected through a server, for example, a home appliance management server.

The cleaner 180 rotates the first rotary plate 81 and the second rotary plate 82 of the spin mop 80 through a driving unit (not shown) to remove foreign substances from a floor surface according to the rotation of the attached cleaning cloth 90. The main body 10 moves by the rotation of the first and second rotary plates 81 and 82 of the cleaner 180. Accordingly, the cleaner 180 may operate as a traveler.

In addition, the cleaner 180 may further include a water supply unit (not shown) and the water tank 32, the water supply unit connected to the spin mop 80 to supply water to the cleaning cloth attached to the first and second rotary plates. The water supply may include a pump or a valve.

The cleaner 180 may include a separate cleaning cloth tool for mounting the cleaning cloth to the spin mop. The battery (not shown) supplies power required not only for the motor, but also for the overall operations of the moving robot 1. When the battery is discharged, the moving robot 1 may travel to return to the charging stand for charging, and during such return traveling, the moving robot 1 may detect a location of the charging stand by itself.

The charging stand 2 may include a signal transmitter (not shown) for transmitting a predetermined return signal. The return signal may be an ultrasonic signal or an infrared signal, but not limited thereto. The obstacle detector 100 emits a pattern of a predetermined shape, and acquires the emitted pattern as an image. The obstacle detector may include at least one pattern emitter (not shown) and a pattern acquirer.

In addition, the obstacle detector may include a sensor, such as ultrasonic sensor, a laser sensor, an infrared sensor, and a 3D sensor, to detect a location of an obstacle. In addition, the obstacle detector 100 may detect an obstacle based on an image of a direction of travel. The sensor unit and the image acquirer may be included in the obstacle detector.

The sensor unit 150 includes a plurality of sensors to detect an obstacle. The sensor unit 150 detects an obstacle located in a forward direction, that is, in a direction of travel, using at least one of an ultrasonic sensor, a laser sensor, and an infrared sensor. The sensor unit 150 may be used as an auxiliary means for detecting an obstacle that cannot be detected by the obstacle detector.

In addition, the sensor unit 150 may further include a cliff sensor that detects the presence of a cliff on a floor within a travel area. When a transmitted signal is reflected and incident, the sensor unit 150 inputs information on whether an obstacle exists or a distance to the obstacle as an obstacle detection signal to the controller 110.

The sensor unit 150 includes at least one inclination sensor to detect an inclination of the main body. When inclined in the forward, rearward, leftward, or leftward direction of the main body, the inclination sensor calculates the inclined direction and an inclined angle. The inclination sensor may be a tilt sensor, an acceleration sensor, and the like, and an acceleration sensor may be any of a gyro type, an inertial type, and a silicon semiconductor type.

The sensor unit 150 may detect a rotation angle and a traveling distance of the main body 10. An angle may be measured using a gyro sensor and the traveling distance may be measured using a laser OFS. In addition, the sensor unit 150 may detect an operating state or an error state using a sensor installed inside the moving robot 1.

The image acquirer 170 may include at least one camera. The image acquirer 170 may include a camera that converts an image of a subject into an electrical signal, converts the electrical signal back into a digital signal, and stores the digital signal in a memory device. The camera may include at least one optical lens, an image sensor (e.g., a CMOS image sensor) including a plurality of photodiodes (e.g., pixels) on which an image is created by light transmitted through the optical lens, and a digital signal processor (DSP) to construct an image based on signals output from the photodiodes. The DSP may produce not only a still image, but also a video consisting of frames constituting still images.

The image sensor is a device that converts an optical image into an electrical signal, and is formed as a chip having a plurality of photodiodes integrated therein. For example, the photodiodes may be pixels. When light, having passed through the lens, forms an image on the chip, charges are accumulated in the respective pixels constructing the image, and the charges accumulated in the pixels are converted into an electrical signal (for example, voltage). As is well known, a Charge Coupled Device (CCD), a Complementary Metal Oxide Semiconductor (CMOS), and the like, may be used as the image sensor.

When the moving robot operates, the image acquirer 170 continuously captures images. In addition, the image acquirer 170 may capture an image at a predetermined cycle or at a predetermined distance unit. The image acquirer 170 may set a shooting cycle according to the moving speed of the moving robot.

The image acquirer 170 may acquire not just an image of an area forward in a direction of travel, but also an image of an upward ceiling shape. The image acquirer 170 stores an image, which is captured during traveling of the main body, in the data unit 120 as image data.

The obstacle detector 100 inputs information on a detected location of a detected obstacle or movement of the obstacle to the controller 110. The sensor unit 150 may input a detection signal regarding an obstacle detected by a provided sensor to the controller. The image acquirer 170 inputs a captured image to the controller.

The controller 110 controls the moving robot to travel within a designated area in an entire travel area. The controller 110 sets an operation mode of the moving robot by processing data input by an operation of the operator 160, outputs an operation state through the output unit 190, and outputs warning sound, sound effect, and voice guidance through a speaker of the output unit according to an operating state, an error state, or detection of an obstacle.

The controller 110 generates a map of a travel area based on an image acquired from the image acquirer 170 and obstacle information detected from the sensor unit 150 or the obstacle detector 100. The controller 110 may generate a map of a travel area based on obstacle information while traveling in the area, and in this case, the controller may generate the map by determining a shape of the travel area based on an image acquired from the image acquirer.

The controller 110 recognizes an obstacle detected by the image acquirer 170 or the obstacle detector 100, and performs a control to travel by performing a predetermined operation or changing a route in response to the recognition of the obstacle. In addition, the controller may output predetermined sound effect or warning sound through the output unit as necessary, and may control the image acquirer to capture an image.

In addition, the controller 110 controls the cleaner 180 to move while cleaning the floor surface in response to a cleaning command. When the main body 10 moves in response to rotation of the cleaner 180, the controller 110 determines an operating state based on whether the main body moves along a designated traveling path and whether the main body properly travels.

The controller 110 sets a movement path to a specific destination, and performs a control to avoid an obstacle while traveling along a movement path.

While traveling straight forward, if the main body deviates from a path without traveling straight forward, the controller 110 may determine that there is an abnormality in the traveling state.

When there is an abnormality in the traveling state, the controller 110 determines whether a cause for the abnormal traveling is due to an abnormality in a driving unit of the cleaner, due to absence of a cleaning cloth, or the like.

The controller 110 compares a set moving path with a traveling path, along which the main body 10 actually moves, to determine a traveling state. The controller 110 determines the traveling state by determining whether or not the main body 10 is traveling according to the moving path set based on a location change during traveling.

When traveling while deviating a predetermined distance from the set moving path, the controller 110 may determine that there is an abnormality in the traveling state.

When an obstacle is detected, the controller 110 determines normal traveling, and when traveling in the absence of any obstacle while deviating a predetermined distance from the moving path, the controller 110 may determine abnormal traveling.

The controller 110 may analyze a cause for abnormal traveling based on a current of a motor. When the motor operates normally and the main body 10 deviates a predetermined distance from the moving path in the absence of any obstacle, the controller 110 may determine abnormal traveling due to a floor state.

The controller 110 may determine a material of the floor surface based on a current value of the motor. When the abnormal traveling continuously occurs, the controller 110 may determine that the abnormal traveling occurs due to the floor material, and thus may change the traveling according to the material of the floor surface.

When abnormal traveling occurs at a particular location, the controller 110 may determine that the abnormal traveling is due to foreign substances. For example, the controller 110 may determine that slipping occurs due to foreign substances on the floor surface.

When slipping occurs, the controller 110 determines a current location. The controller 110 stores a location where abnormal traveling (that is, the slipping) occurs, and sets the corresponding location to be re-cleaned. When slipping occurs, the corresponding location is not normally cleaned and there is a substantial amount of foreign substances causing the slipping, and therefore, the controller may determine that cleaning has not performed completely and thus may set the location to be re-cleaned.

When abnormal traveling occurs at a plurality of locations, the controller may set an abnormality area by connecting locations within a predetermined distance, and set the abnormality area to be re-cleaned.

The controller 110 may set to re-clean a location where abnormality occurs after cleaning of other areas is completed. Additionally or alternatively, the controller 110 may be set to immediately re-clean the location where the abnormality occurs and then clean other areas.

In some cases, the controller 110 may selectively perform re-cleaning according to a user command input from the terminal, while transmitting a notification according to an abnormality to the terminal.

When re-cleaning, the controller 110 may set to perform cleaning again while traveling along a different moving path from a current moving path.

In addition, when abnormal traveling occurs, the control unit 110 may immediately generate a notification and request replacement of a cleaning cloth. When the cleaning cloth is replaced, the controller 110 may perform cleaning again.

Meanwhile, when abnormal traveling occurs, especially when it is determined that slipping occurs, the control unit 110 may perform compensative traveling in preparation for sliding due to a floor material or due to foreign substances.

For example, when slipping to the right side occurs while traveling straight forward, the controller 110 may control traveling to the left side by a predetermined angle to compensate for the slipping to the right side. In addition, when an actual moving distance is larger than a moving distance to be travelled, the controller 110 may perform compensative traveling for the slipping by adjusting a rotational speed to adjust a force to move forward.

When there is an abnormality in the traveling state, the controller 110 may generate a warning message, a warning sound, and the like to notify the abnormality and may output the same through the output unit 190. The controller 110 may display a warning in a combination of at least one of a message, an icon, and an image on a control panel provided on the upper portion of the main body 10, and may turn on a warning light, and voice guidance may be output.

When there is abnormality in the traveling state, the controller 110 may set to perform re-cleaning according to a cause for the abnormality. When performing re-cleaning, the controller 110 may output a notification of the re-cleaning through the output unit.

In addition, when there is abnormality in the traveling state, the controller 110 may stop an operation. The controller 110 stops the operation when it is determined that the cleaning cloth is not installed or the motor or the driving unit is in an abnormal state.

In addition, the controller 110 generates a warning according to occurrence of an abnormality and transmits the generated warning through the communication unit 130 to the terminal 300.

If it is determined that there is an abnormality in a traveling state, the controller 110 may store a location where the abnormality occurs and may display the corresponding location on a map. The controller 110 may transmit data on the location where abnormal traveling occurs to the terminal 300 so that the location is displayed on the map on a screen through the terminal.

The terminal 300 displays the location on which the abnormal traveling occurs on the map according to the data received from the controller 110. In addition, the terminal 300 may display a message for replacement of the cleaning cloth based on the received data.

In the case of stopping an operation, when a cleaning command is input again from the operator or the terminal 300, the controller 110 may reattempt to travel and re-determine a traveling state.

The controller 110 may analyze sound input through the audio input unit to recognize a voice. In some cases, the controller 110 may transmit input sound to a voice recognition server (not shown) to recognize an input voice. When the voice recognition is completed, the controller 110 performs an operation corresponding to a voice command.

In addition, the controller 110 outputs voice guidance corresponding to the voice command through the speaker of the output unit 190.

The controller 110 checks the charging capacity of the battery and determines a time to return to the charging stand. When the charging capacity reaches a predetermined value, the controller 110 stops an operation being performed and starts searching for the charging stand to return to the charging stand. The controller 110 may output a notification about the charging capacity of the battery and a notification about return to the charging stand. Further, when a signal transmitted from the charging stand is received through the communication unit 130, the controller 110 may return to the charging stand.

The controller 110 includes an obstacle recognizer 111, a map generator 112, a travel controller 113, and a location recognizer 114.

In the case of an initial operation or in the case where no map about an area is stored, the map generator 112 generates a map of the area based on obstacle information while traveling the area. In addition, the map generator 112 updates a previously generated map based on obstacle information acquired during traveling. In addition, the map generator 112 generates a map by analyzing an image acquired during traveling and determining a shape of the area based on a result of the analysis.

After generating a basic map, the map generator 112 divides a cleaning area into a plurality of areas and generates a map that includes passages connecting the plurality of areas and information on any obstacle in each of the plurality of areas.

The map generator 112 processes a shape of each divided area. The map generator 112 may set attributes for each divided area.

In addition, the map generator 112 may distinguish an area based on features extracted from an image. The map generator 112 may determine a location of a door based on a connection relationship of the features, and may distinguish boundaries between the areas to generate a map composed of the plurality of areas.

The obstacle recognizer 111 may determine an obstacle based on data input from the image acquirer 170 or the obstacle detector 100, the map generator 112 may generate a map of a travel area, and information on a detected obstacle may be included in the map.

The obstacle recognizer 111 analyzes data input from the obstacle detector 100 to determine an obstacle. A direction of an obstacle or a distance to the obstacle is calculated according to a detection signal from the obstacle detector, for example, an ultrasonic signal, a laser signal, or the like. In addition, the obstacle recognizer may extract the pattern by analyzing an acquired image including a pattern and determine an obstacle by analyzing a shape of the pattern. When an ultrasonic or infrared signal is used, there may be a difference in shape of received ultrasonic waves or a difference in time of receiving the ultrasonic waves according to a distance to an obstacle or a location of the obstacle, and therefore, the obstacle recognizer 111 determines the obstacle based on the above.

The obstacle recognizer 111 may determine an obstacle located around the main body by analyzing an image captured through the image acquirer 170.

The obstacle recognizer 111 may detect a human body. The obstacle recognizer 111 analyzes data input through the obstacle detector 100 or the image acquirer 170, detect a human body based on a silhouette, a size, a face shape, and the like, and determine whether the corresponding human body is a registered user.

The obstacle recognizer 111 extracts features of an object by analyzing image data, determines an obstacle based on a form (shape), a size, and a color of the obstacle, and determines a location of the obstacle.

The obstacle recognizer 111 may determine an obstacle by extracting features of the obstacle based on previously stored obstacle data, except a background of an image, from image data. The obstacle data is updated by new obstacle data received from the server. The moving robot 1 may store obstacle data on a detected obstacle and receive data on a type of the obstacle from the server for other data.

In addition, the obstacle recognizer 111 may store information on a recognized obstacle in obstacle data and may transmit recognizable image data to a server (not shown) through the communication unit 130 to determine a type of the obstacle. The communication unit 130 transmits at least one image data to the server.

The obstacle recognizer 111 determines an obstacle based on image data converted by an image processor. The location recognizer 114 calculates a current location of the main body. The location recognizer 114 may determine a current location based on a signal received using a provided location recognizing device, for example, GPS, UWB, or the like.

The location recognizer 114 may extract features from an image acquired from the image acquirer, that is, image data, and compare the features to determine a current location. The location recognizer 114 may determine a current location based on a structure surrounding the main body, a ceiling shape, and the like, which are found in an image.

The location recognizer 114 detects features such as points, lines, and planes for predetermined pixels constituting an image, and analyzes characteristics of an area based on the detected features to determine a current location. The location recognizer 114 may extract an outline of a ceiling and extract features such as lighting.

The location recognizer continuously determines a current location in an area based on image data, matches features, performs learning by matching features and reflecting a change in a surrounding structure, and calculates a value of the location.

The travel controller 113 performs a control to travel an area based on a map and to change a direction of travel or a traveling path based on detected obstacle information to pass through or avoid an obstacle.

The travel controller 113 controls the cleaner 180 according to the cleaning command, so that cleaning can be performed as the main body 10 removes foreign substances from a floor surface while traveling the cleaning area.

The travel controller 113 controls a driving unit (not shown) of the cleaner 180 to control the operation of the first rotary plate 81 and the second rotary plate 82 independently, so that the main body 10 travels straight forward or rotates to travel.

The travel controller 113 controls the main body to move to a set area based on a map generated by the map generator 112 or move within the set area. In addition, the travel controller 113 controls traveling based on a current location calculated from the location recognizer 114.

The travel controller 113 performs a control to perform a predetermined operation in response to an obstacle or change a traveling path according to a detection signal from the obstacle detector 100.

The travel controller 113 performs a control to perform at least one of the following in response to a detected obstacle: avoiding the obstacle, approaching the obstacle, setting an approaching distance, stopping, decelerating, accelerating, reverse traveling, making a U-turn, and changing a direction of travel.

The travel controller 113 determines a traveling state based on information on a location change, which is received from the location recognizer, and when abnormal traveling occurs, the travel controller generates an error in response to the abnormal traveling.

When there is an abnormality in a traveling state, the travel controller 113 may determine a cause for the abnormality and may maintain the operation or stop the operation in response to the abnormality and may also perform compensative traveling. For example, when there is an abnormality in a traveling state because the cleaning cloth is not attached, the operation may be stopped and a notification for the absence of the cleaning cloth may be output. In addition, when a location change of a predetermined size or more occurs due to a floor material or foreign substances on a floor, for example, when slipping occurs, corresponding location information is stored, and compensative traveling for the slip is performed.

When abnormal traveling occurs, the travel controller 113 may determine whether it is possible to travel: when it is possible to travel, the travel controller may return to a moving path to travel, and when it is not possible to travel, the travel controller may stop an operation.

In addition, the travel controller 113 outputs an error and may output predetermined warning sound or voice guidance as necessary.

Figure 5:
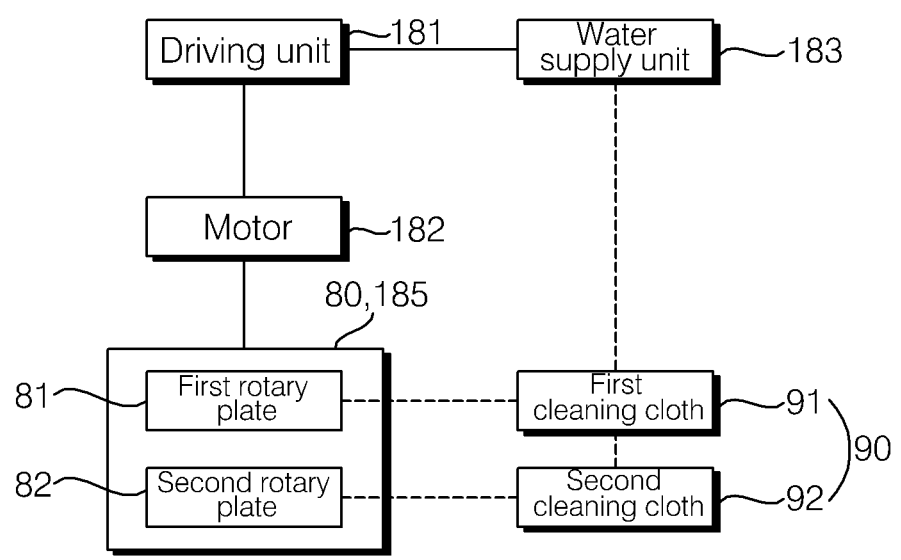
FIG. 5 is a block diagram illustrating a configuration of a cleaner of a moving robot according to an embodiment of the present disclosure.

FIG. 5 is a block diagram briefly illustrating configuration of a cleaner of a moving robot according to an embodiment of the present disclosure. As shown in FIG. 5, the cleaner 180 allows the main body 10 to move while cleaning a floor surface. The cleaner 180 includes a driving unit 181, a cleaning cloth 90, a spin mop 80, 185, a water supply unit, and a motor 182. The spin mop 185, 80 is connected to a rotational shaft of the motor 182 to rotate. The spin mop 185 includes a first rotary plate 81 and a second rotary plate 82.

In addition, the spin mop 185 may further include an adjuster (not shown) that adjusts a distance between the casing and the first rotary plate 81 and a distance between the casing and the second rotary plate 82, so that cleaning cloths 90, 91, 92 attached to the first rotary plate 81 and the second rotary plate 82 can contact the floor surface. The adjuster may apply a pressure of a predetermined strength, so that the first rotary plate 81 and the second rotary plate 82 can contact the floor surface. Accordingly, the cleaning cloths are attached to the first rotary plate 81 and the second rotary plate 82 to contact the floor surface, regardless of a thickness.

The first rotary plate 81 and the second rotary plate 82 may be configured such that first and second cleaning cloths 91 and 92 can be directly installed at the first and second rotary plates, respectively. For example, Velcro® may be attached to the first rotary plate 81 and the second rotary plate 82 to fix the cleaning cloths.

In addition, cleaning cloth frames (not shown) may be installed at the first rotary plate 81 and the second rotary plate 82. The cleaning cloths are fitted to the cleaning cloth frames and installed at the first rotary plate 81 and the second rotary plate 82. The first rotary plate 81 and the second rotary plate 82 rotate and operate independently of each other. The driving unit may control the first rotary plate 81 and the second rotary plate 82 are rotated according to different patterns.

The first rotary plate 81 and the second rotary plate 82 are connected to the rotational shaft of the motor, rotate, and may operate in different directions and at different rotation speeds. The driving unit 181 controls a rotational speed, driving, and stopping of the motor 182 in response to a control command from the travel controller 113. The driving unit 181 supplies operation power for driving the motor.

The driving unit 181 operates when the main body 10 moves to a destination along a movement path or cleans a designated area. The driving unit 181 controls the motor 182 such that the first and second rotary plates are rotated independently. The driving unit 181 controls the motor 182 by determining whether to operate the first rotary plate 81 and the second rotary plate 82 and rotational speeds of the first rotary plate 81 and the second rotary plate 82 according to a movement path, a shape of an area, and a size and a location of an obstacle.

The motor 182 transmits a rotational force to the first rotary plate and the second rotary plate. The motor 182 may be provided in plural. For example, a first motor (not shown) may be connected to the first rotary plate, and a second motor (not shown) may be connected to the second rotary plate. The motor 182 rotates the first rotary plate 81 in a first direction, and rotates the second rotary plate 82 in a second direction, which is a direction opposite to the first direction, so that the main body 10 can move forward.

In addition, in the case of moving to the left or right along a movement path, the motor 182 may rotate the first rotary plate and the second rotary plate differently to move the main body 10. The motor can rotate the main body 10 by stopping one of the first rotary plate and the second rotary plate and rotating the other one.

The water supply unit 183 supplies water contained in the water tank to the cleaning cloth. The water supply unit supplies water to the cleaning cloth while the main body 10 performs cleaning, so that the cleaning cloth can remain wet.

The water supply unit 183 supplies a predetermined amount of water to the cleaning cloths for a predetermined period of time. The water supply unit 183 includes a connecting flow path that connects the cleaning cloths and the water tank.

When the driving of the motor is stopped by the driving unit 181, the water supply unit 183 may stop water supply. The water supply unit 183 may include a valve (not shown) that controls water supply to the cleaning cloths. In addition, the water supply unit 183 may include a pump (not shown) that controls a water supply from the water tank to the cleaning cloths.

When the driving of the motor is stopped, the controller 110 may stop the operation of the pump or close the valve to prevent water from being supplied to the cleaning cloths.

Figure 6:
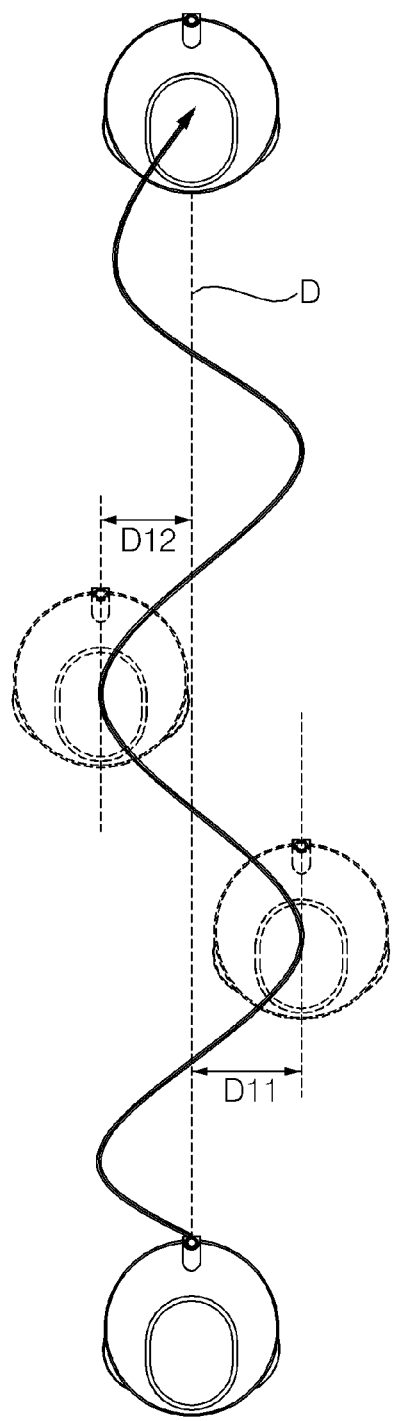
FIGS. 6 and 7 are diagrams used for explaining a traveling path according to a floor state of a mobile robot according to an embodiment of the present disclosure.
Figure 7:
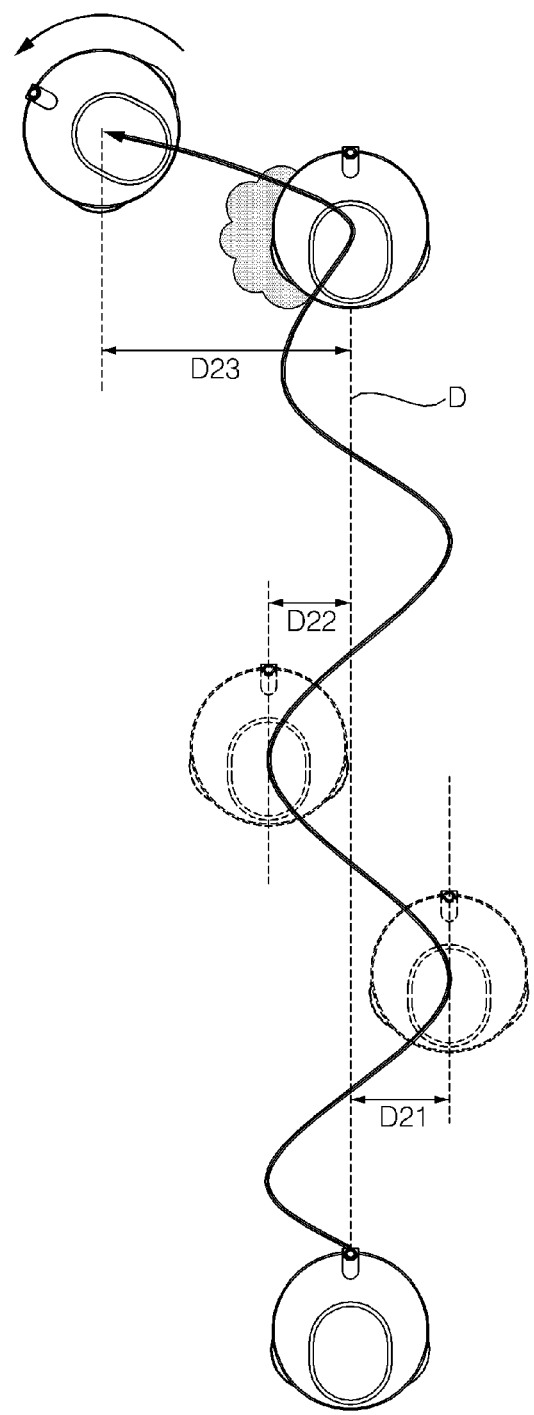

FIGS. 6 and 7 are diagrams referred to for explaining a driving path according to a floor state of a moving robot according to an embodiment of the present disclosure. As illustrated in FIG. 6, the moving robot 1 may move along a moving path D. The moving robot 1 may travel linearly.

When the motor of the cleaner 180 starts rotating, the first and second rotating plates are rotated, so a friction force between a cleaning cloth and a floor surface acts and accordingly the moving robot 1 moves in a designated direction. The cleaning cloth rotates to clean up foreign substances in a floor surface.

As the first rotating plate 81 is rotated in a first direction and the second rotating plate 82 is rotated in a second direction, the moving robot 1 may travel in a straight line. In addition, the moving robot 1 may move or rotate to the left or right by setting rotational speeds of the first and second rotating plates differently or by setting the same rotational direction for the first and second rotating plates.

As the first cleaning cloth 91 and the second cleaning cloth 92 are mounted to the first and second rotating plates, respectively, the moving robot 1 cleans the floor surface with the cleaning cloths while traveling. While the moving robot 1 travels, the water supply unit 183 supplies water in the water tank 32 to the cleaning cloth 90 to keep the cleaning cloth wet.

The moving robot 1 may depart from a moving path within an error range to travel. When an obstacle is detected, the moving robot 1 may change the moving path or travel outside the moving path. In addition, depending on a floor material or rotation of the rotating mop 80, the moving robot 1 may deviate from the path within a predetermined error range to travel.

When moving, the controller 110 determines a location change based on displacement in a distance and an angle. Using the location recognizer 114 or the sensor unit 150, the controller 110 calculates a location value with respect to a traveling distance and a rotation angle. The controller 110 calculates a coordinate value based on a traveling distance on X axis and Y axis, and stores a location value. In addition, the controller 110 may store a traveling distance on X axis and Y axis and a rotation angle measured by an angle sensor as a location value.

The controller may calculate a location value based on an angle measured by a gyro sensor and a traveling distance measured by a laser OFS. In addition, the controller 110 may calculate a traveling distance and a rotation angle based on a motor RMP and a rotational speed of the cleaning unit 180. The controller 110 may calculate a traveling distance and a rotation angle based on an acquired image. In addition, the controller may set a reference for an angle trajectory based on a value that is 1.5 times the radius of the main body.

The controller 110 calculates an actual location value of the main body based on a moving path D while traveling, and when a location change is less than a predetermined distance, it is normal traveling within an error range and thus the controller determines normal traveling. For example, the error range may be set to a range of 3 mm to 5 mm, and the error range may be changed according to a setting.

If a location change is greater than the predetermined distance, it is regarded as deviation from a moving path and the controller 110 determines abnormal traveling. In response to a location change during traveling, the controller 110 calculates an 11th distance D11 and a 12th distance D12, and determines whether the 11th distance and the 12th distance are greater than the predetermined distance. When the 11th distance and the 12th distance are less than the predetermined distance, they fall within the error range and thus the controller 110 determines normal traveling along a moving path.

In addition, as shown in FIG. 7, the controller 110 calculates a 21st distance D21, a 22nd distance D22, and a 23rd distance D23 based on the moving path D, and compares the calculated distances with the predetermined distance. When the 21st distance D21, the 22nd distance D22, and the 23rd distance D23 are less than the predetermined distance, the controller 110 determines normal traveling. When the 21st distance D21, the 22nd distance D22, and the 23rd distance D23 are equal to or greater than the predetermined distance, the controller 110 determines deviation from the moving path and thus determine abnormal traveling. The controller 110 calculates location information on a location where abnormal traveling occurs, and stores the location information. For example, when there are foreign substances such as water, oil, juice, etc. on a floor surface, it may lead to a difference in rotation of any one of the first rotating plate and the second rotating plate during traveling, thereby causing the main body 10 to slip in a particular direction.

Based on a point in time when the abnormal traveling is determined, the controller 110 may set and store the corresponding location as a location where the abnormal traveling occurs. Based on a point in time when the abnormal traveling is determined, the controller 110 may set an area within a predetermined distance from the corresponding location as a location where an abnormality occurs. Based on a point in time when the abnormal traveling is determined, the controller 110 may set a predetermined area based on a traveling path for a predetermined period of time before the point in time as a location where the abnormal traveling occurs.

In addition, the controller 110 transmits data on the location where the abnormal driving occurs to the terminal so that the location is displayed on a map. When abnormal traveling occurs, the controller 110 determines whether it is possible to travel, and then returns to an existing moving path to continue traveling. Meanwhile, when abnormal traveling occurs, the controller 110 determines whether the spin mop 80 spins normally based on a current value of the motor.

When the moving robot is a predetermined distance away from the moving path while the spin mop spins normally, the controller 110 determines that abnormal traveling occurs. The controller 110 may determine that abnormal traveling occurs due to foreign substance on a floor surface. When abnormal traveling occurs, the controller 110 may set re-cleaning for an area within a predetermined distance based on a location where the abnormal traveling as occurred or for an area connecting a plurality of location where the abnormal traveling occurs.

Meanwhile, when abnormal traveling occurs constantly since the start of travel, the controller 110 may determine that the abnormal traveling is caused by an abnormality of the driving unit or the motor, or sometimes by a material of a floor surface. When abnormal traveling is caused by the material of the floor surface, the controller 110 may change a predetermined distance, which is a reference for an error range, to change a criteria for determining as to abnormal traveling. For example, if the floor surface is slippery glass or marble, a predetermined distance for determining as to abnormal traveling may be increased to continue traveling.

During traveling, the controller 110 may determine a material of a floor surface based on a current value of the motor. Since a slippery material has a small friction with a cleaning cloth, a small current value is detected compared to a current value detected in response to a general floor material is detected, and accordingly, the material of the floor surface may be determined in consideration of the above.

In the case where the water level of the water tank 32 is equal to or greater than a certain value, the cleaning cloth is normally installed, and the motor or driving unit operates normally, if a current value of 100 mA to 300 mA is detected based on a wet cleaning cloth with respect to which a current value of motor can be detected within a range of 350 mA to 8000 mA, the controller 110 may determine that the floor material is a slippery material.

While the water level in the water tank is equal to or greater than the predetermined value, when a current value is detected within a range of 100 mA to 300 mA except when the water supply is abnormal, the detected current value may be equal to or less than a current value of a dry cleaning cloth in a range of 250 mA to 350 mA, and thus, the floor material may be determined as a material with a small friction. Meanwhile, when a current value of 700 mA to 900 MA is detected, a floor material may be determined as a material with a great friction.

In addition, when there is an abnormality in the driving unit or the motor, the controller stops an operation and output a warning through the output unit. When cleaning on a preset area is completed after abnormal traveling occurs, the controller 110 may perform re-cleaning on a location where the abnormality occurs. The controller 110 may immediately perform re-cleaning based on a point in time when the abnormality occurs, and a re-cleaning order may be changed according to a setting. In some cases, the re-cleaning order may be set in response to a user command input from the operator or the terminal.

When abnormal traveling repeatedly occurs at a particular location, the controller 110 may first clean an area based on the location, may exclude the corresponding area from the traveling to clean the area lastly, or may set the corresponding area as a separate exceptional area where intensive cleaning is to be performed.

Figure 8:
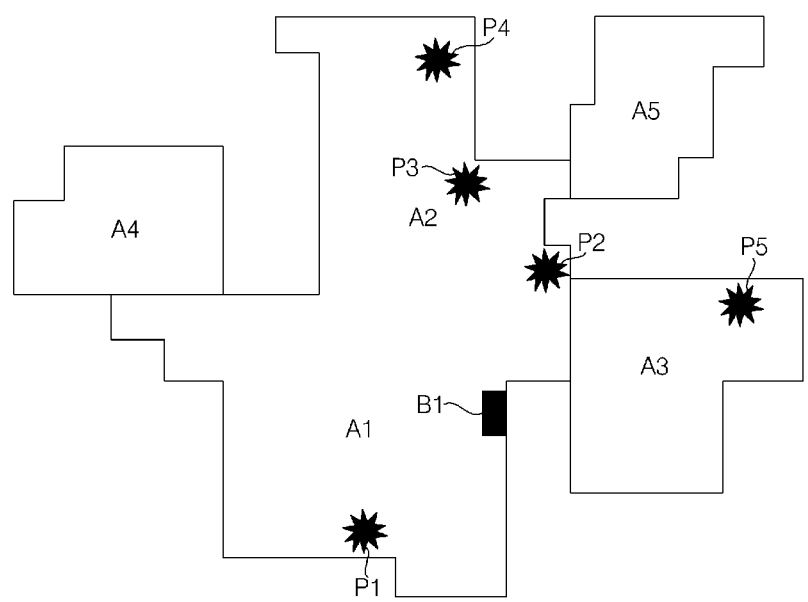
FIG. 8 is a diagram illustrating a map in which abnormal traveling of a moving robot according to an embodiment of the present disclosure is displayed.

FIG. 8 is a diagram illustrating a map in which abnormal traveling of a moving robot according to an embodiment of the present disclosure is displayed. The moving robot 1 transmits data on a location at which the abnormal traveling occurs to the terminal 300.

The terminal 300 may input a cleaning command for an entire area or a selected partial area of the indoor area divided into a plurality of areas. The terminal 300 transmits a cleaning command to the moving robot 1. In addition, the terminal 300 may display a cleaning state based on data received from the moving robot 1 and display the location of the moving robot. In addition, as illustrated in FIG. 8, the terminal 300 displays locations P1 to P5 where abnormal traveling occurs on a map based on data received from the moving robot 1.

The terminal or the moving robot sets re-cleaning of an area within a predetermined distance based on the locations P1 to P5 where abnormal traveling occurs. In addition, the terminal or the moving robot may set re-cleaning by setting an area connecting a plurality of locations according to a distance between locations where an abnormality occurs, and may perform intensive cleaning to clean the corresponding locations or the corresponding area multiple times.

For example, an area may be set by connecting the third point P3 and the fourth point P4, and the area may be set to be cleaned again. With respect to a location at which abnormal traveling occurs, the terminal 300 may set re-cleaning of a selected area in response to a user input. In addition, with respect to a location at which abnormal traveling occurs, the terminal 300 may set a re-cleaning order in response to a user input. The terminal 300 may provide information on a location where abnormal traveling occurs, and a cause for the abnormal traveling, for example, slipping. In addition, the terminal 300 may output, through a pop-up window, a message that requests replacement of the cleaning cloth. The moving robot 1 may also display, through the output unit, a message, a notification, and the like that requests replacement of the cleaning cloth.

The terminal 300 accumulatively stores information on a location where abnormal traveling occurs, and when slipping occurs repeatedly at a particular location, the terminal 300 may set the location as a separate exceptional area. The terminal 300 may set to firstly clean an area where slipping occurs repeatedly or to clean the corresponding area lastly after cleaning other areas. The terminal 300 may set to travel while avoiding the corresponding area.

In addition, the terminal 300 may display information on an area where slipping occurs repeatedly. For example, intensive cleaning may be set such that if the other area is cleaned once, the area where slipping occurs repeatedly is cleaned twice or three times. In addition, the terminal 300 may display information on an area where slipping occurs repeatedly.

Figure 9:
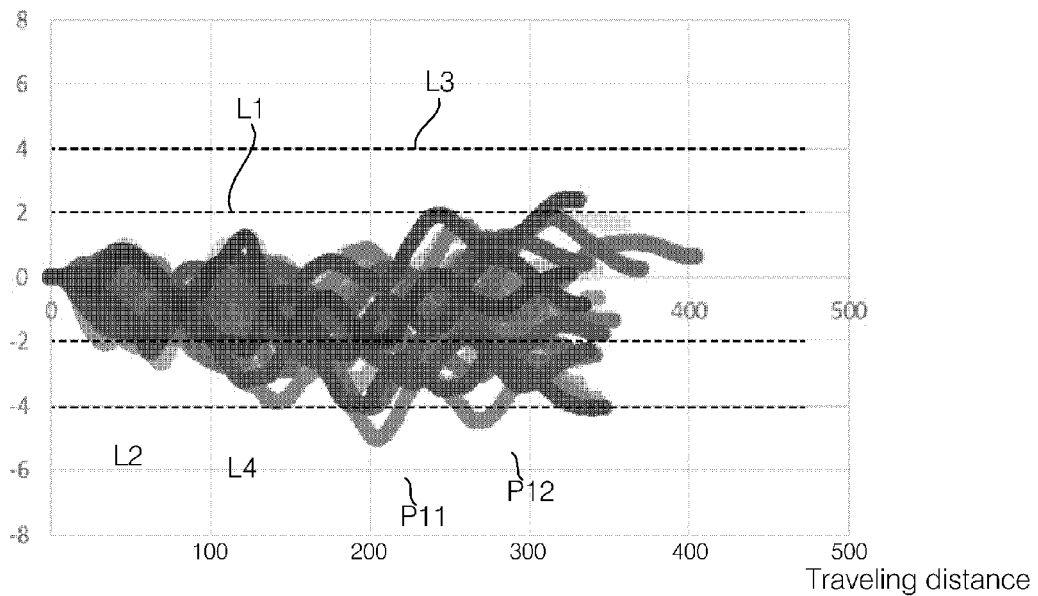
FIGS. 9 and 10 are exemplary views used for explaining traveling of a moving robot according to an embodiment of the present disclosure.
Figure 10:
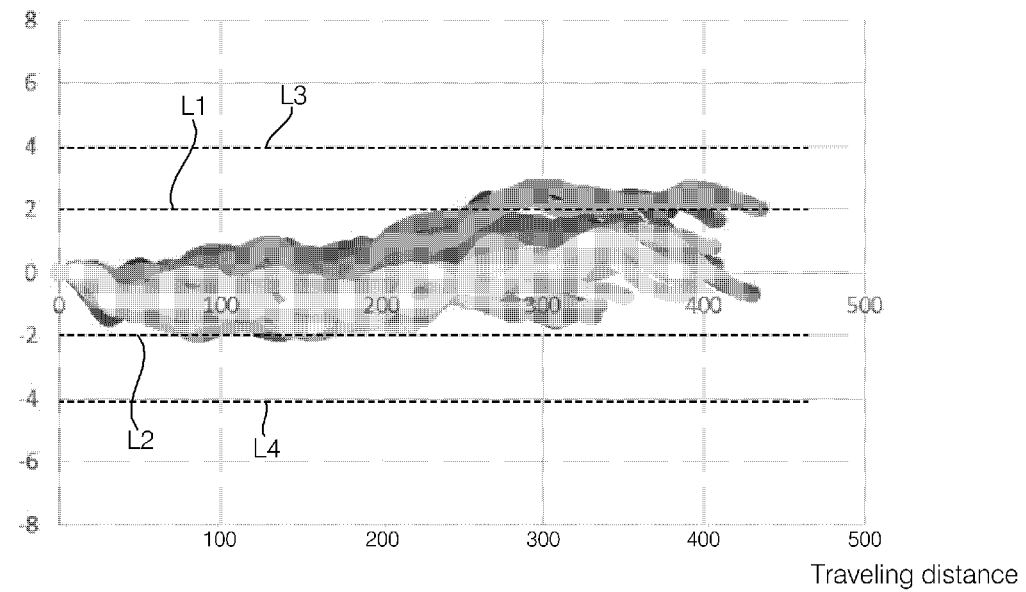

FIGS. 9 and 10 are exemplary views referred to for explaining traveling of a moving robot according to an embodiment of the present disclosure. FIG. 9 is a diagram illustrating a plurality of traveling paths for the moving robot 1 to travel straight forward. The horizontal axis represents a distance, and the vertical axis represents a traveling width for left and right traveling when a straight path is defined as 0. Even if the moving robot 1 is set to travel straight forward, the moving robot is not moved in response to rotation of a wheel, but moved in response to rotation of the spin mop 80, and thus, the moving robot may travel while deviating from a moving path to the left or right.

In addition, since the moving robot 1 moves in a state in which the cleaning cloth is tightly attached to a floor surface, the moving robot may travel while deviating from a moving path to the left or the right due to the floor material or foreign substance on the floor. Accordingly, an error range is set based on the moving path and a traveling width according to a location change is calculated to determine as to normal traveling or abnormal traveling. Movement within an error range is determined as normal traveling.

For example, the determination may be made based on a reference line when the error range is 2 mm (L1, L2) and a reference line when the error range is 4 mm (L3, L4). In addition, the error range may be set to 5 mm. The error range may be changed according to a setting.

In some cases, it is possible to set different error ranges for the left and right sides in consideration of traveling characteristics of the moving robot. For example, when the moving robot has a characteristic of traveling while deflected to the right, the error range for the left side may be set to 3 mm and the error range for the right side may be set to 5 mm.

When the moving robot 1 travels in a straight line, the moving robot 1 may deviate a predetermined distance from a moving path, as in an 11th point P11 and a 12th point P12. When the error range is set to 2 mm, with respect to the reference line L1 on the left and the reference line L2 on the right, deviation to the left occurs from a point of 250 mm, whereas deviation to the right may occur continuously after a point of 50 mm. When the error range is set to 2 mm, the moving robot frequently determines abnormal traveling, so it is necessary to change the error range to determine a traveling state.

When the error range is set to 4 mm, with respect to the left reference line L3 and the right reference line L4, normal traveling of the moving robot may occur in the left side, whereas abnormal traveling of the moving robot may occur in the right side at the 11th point P11 and the 12th point P12. Since the main body has a characteristic of traveling in a straight line while deflected to the right, the controller 110 may set different error ranges for the left and right sides.

In addition, the controller 110 may compensate for traveling of the moving robot by performing compensative traveling, as illustrated in FIG. 10. As the moving robot travels while deflected to the right, the controller 110 sets different rotational speeds of the first and second rotating plates, so that the main body can travel while deflected to the left side, thereby correcting the deflection to the right side.

In addition, the controller 110 may perform compensative traveling based on a point in time at which abnormal traveling occurs, such as the 11th point P11 and the 12th point P12. Compensative driving is to correct an operation so that an actual traveling path has straightness. Compensative traveling may be set according to a frequency of occurrence of deviation to the left or right from the error rage or according to a traveling width.

Figure 11:
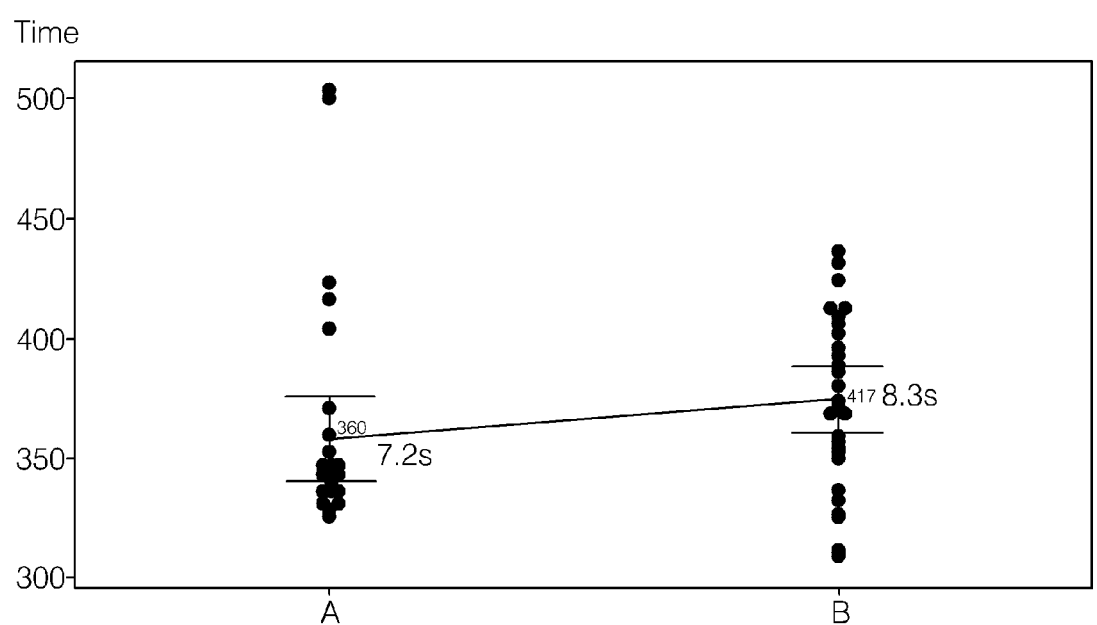
FIG. 11 is a diagram used for explaining a travel time according to abnormal traveling of a moving robot according to an embodiment of the present disclosure.

FIG. 11 is a diagram referred to for explaining a travel time according to abnormal traveling of a moving robot according to an embodiment of the present disclosure. As described above, the controller 110 may perform compensative traveling when abnormal traveling occurs or when traveling while deflected in a particular direction is detected. During the compensating traveling, the first rotary plate 81 and the second rotary plate 82 in the spin mop 80 are driven in different patterns, so different loads are set for the both sides, thereby increasing a travel time compared to the case of traveling in a straight line with the same load for the both sides.

As shown in FIG. 11, A is a value of a travel time measured until reaching a designated travel distance during basic traveling, and B is a value of a travel time measured until reaching the particular travel distance during compensative traveling. For example, an average travel time of average traveling may be about 7.2 seconds, whereas an average travel time of compensative traveling may be about 8.3 seconds.

As a travel time increases in the case of compensative traveling, the controller 110 may set a frequency of occurrence of abnormal traveling and whether to perform compensation traveling according to a traveling width.

When it is necessary to complete cleaning in a short period of time or when an area to be cleaned is large, the controller 110 may determine whether to perform compensative traveling. However, when a degree of slipping is severe, that is, when a traveling width is large, the controller 110 controls the spin mop 80 so that the main body moves through compensation traveling. In addition, when the number of occurrences of abnormal traveling at a particular location is equal to or greater than a predetermined value or more, the controller 110 may set to pass through a corresponding area through compensative traveling. Even when abnormal traveling does not compensate due to compensative traveling, the controller may set a location where abnormal traveling occurs on a corresponding path according to whether compensative traveling is performed and a travel time.

Figure 12A:
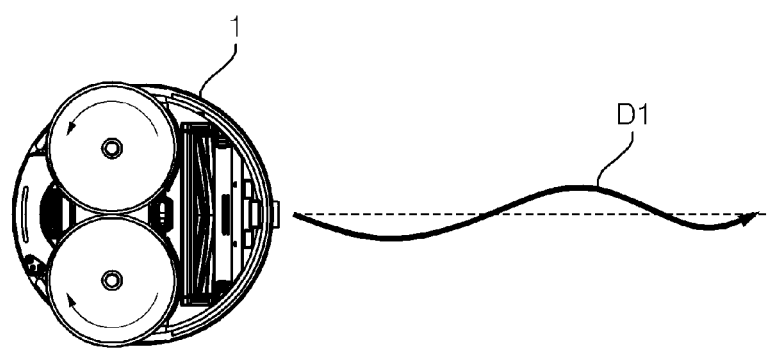
FIGS. 12(a) and 12(b) are diagrams used for explaining abnormal traveling of a moving robot according to an embodiment of the present disclosure.
Figure 12B:
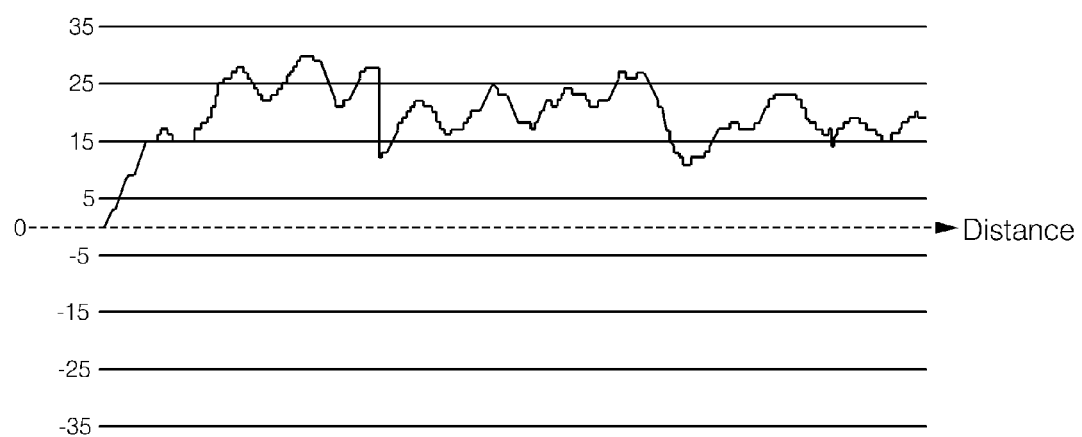

FIGS. 12(a) and 12(b) are diagrams referred to for explaining abnormal traveling of a moving robot according to an embodiment of the present disclosure. As shown in FIG. 12(a), the moving robot 1 moves in response to rotation of the spin mop in a state in which the moving robot is set to travel along a moving path D1. However, a different load may be applied from the main body to the spin mop depending on an internal configuration of the main body 10 and locations of components. Accordingly, even when the first rotary plate 81 and the second rotary plate 82 are rotated identically, the moving robot may travel while deflected in a particular direction due to imbalance of weight of the main body.

As shown in FIG. 12(b), traveling within an error range of 2 mm to 6 mm may be determined as normal traveling, but when departure of, for example, 10 mm up to 33 mm from a traveling width occurs as shown in the drawing, the controller 110 performs compensative traveling. The controller may perform compensative traveling by adjusting a left-right tilting angle of the spin mop. The controller may perform compensative traveling by setting different rotational speeds for the first rotating plate 81 and the second rotating plate 82 of the spin mop.

The controller 110 may compare a moving path and a traveling path, accumulatively store the same, and determine traveling characteristics of the main body based on the stored information. When slipping occurs temporarily or at a particular location due to foreign substances on a floor, the controller 110 performs basic traveling, and when abnormal traveling occurs repeatedly, the controller performs compensative traveling.

When the main body has a traveling characteristic of traveling while deflected in a particular direction, the controller 110 may change a setting for the basic traveling so that the traveling characteristics is corrected to travel. In addition, the controller 110 may set different error ranges for the left side and the right sides to determine whether abnormal traveling is performed.

Figure 13:
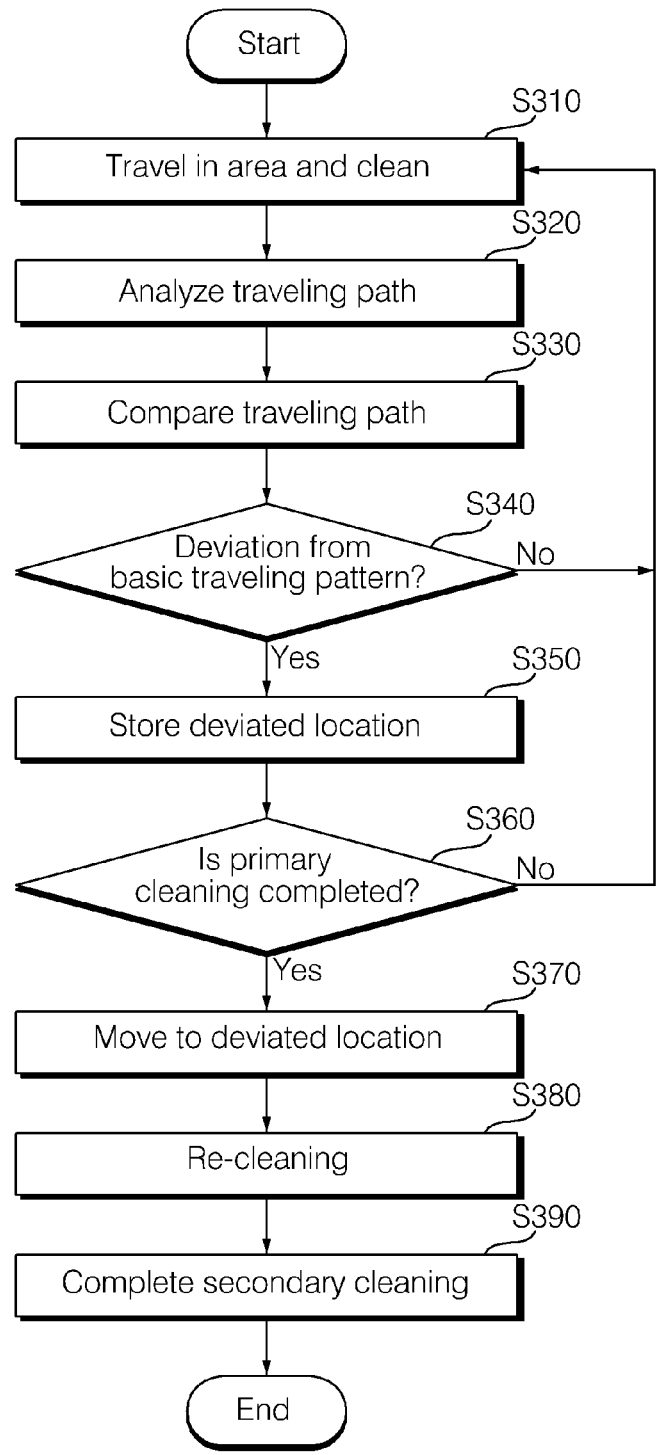
FIG. 13 is a flowchart illustrating a control method of a moving robot according to an embodiment of the present disclosure.

FIG. 13 is a flowchart illustrating a control method of a moving robot according to an embodiment of the present disclosure. As illustrated in FIG. 13, when a cleaning command or a command to move to a particular location is input, the moving robot 1 moves while the spin mop 80 spins in operation S310. As the cleaning cloth 90 attached to the spin mop 80 is rotated by the spin mop, a floor surface is cleaned.

The driving unit operates the motor in response to a control command from the controller, and causes the first and second rotating plates 81 and 82 connected to the motor to rotate. The rotational directions and rotational speeds of the first rotating plate and the second rotating plate are changed according to a direction of travel. When moving to a particular location, the main body 10 sets a moving path to a destination and moves. When cleaning an area, the main body 10 moves by setting a traveling pattern corresponding to the size or shape of the area and setting a moving path according to the driving pattern. For example, the main body 10 may perform cleaning while traveling in a spiral pattern, a zigzag pattern, or a Y-shaped pattern, and may also set a traveling pattern for a predetermined distance from an obstacle.

The controller 110 controls the spin mop 80 to travel along the moving path, analyzes an actual traveling path based on a location change in operation S320, and compares the traveling path with the moving path in operation S330 to calculate a traveling width, that is, a distance to a location actually travelled from the moving path.

The controller 110 determines whether the main body deviates from the basic traveling pattern according to the moving path based on an analysis result in operation S340. The controller 110 may determine whether or not the moving path deviates, by determining whether a traveling width according to a location change falls within an error range. When a traveling width is larger than a set distance according to an error range as described above in FIG. 7, abnormal traveling by deviating from the moving path is determined. When a traveling width is within an error range, normal traveling is determined.

In the case of normal traveling, cleaning is performed while moving according to a set moving path and a traveling pattern. At this time, the controller 110 first determines whether abnormal traveling is due to a collision with an obstacle or and whether the abnormal traveling is due to an abnormality in the motor or the driving unit itself. The controller 110 may determine whether the abnormal traveling is due to an abnormality in itself based on a current value of the motor.

In addition, the controller 110 may determine whether the cleaning cloth is properly installed. When the main body does not move or when the main body is rotating without departing a predetermined distance, the controller 110 may determine that the cleaning cloth is not installed. In some cases, whether the cleaning cloth is installed may be detected through an additional sensor.

When there is no obstacle, the motor or the driving unit is operating normally, and the cleaning cloth is installed, abnormal traveling may be determined due to a floor state. The controller 110 may determine whether a floor material is a slippery material based on a current value of the motor. In addition, the controller 110 may determine whether the abnormal traveling is caused by slipping due to foreign substances on the floor. In case of moving more than an actual traveling distance and in the case of departing to the left or the right from the moving path, the controller 110 may determine that slipping occurs due to foreign substances.

When a floor material is a slippery material, slipping occurs from the beginning of the traveling, and thus, the controller 110 may distinguish slipping caused by the floor material and slipping caused by foreign substances.

When abnormal traveling occurs, the controller 110 calculates and stores a location where the abnormal traveling occurs, or location information on an area at a predetermined distance from the location in operation S350.

When abnormal traveling occurs, the controller 110 generates a notification notifying the abnormal traveling and outputs the notification. The controller 110 may generate a notification in the form of a warning message, a warning light, and a warning sound and output the notification through the output unit. In addition, the controller 110 transmits data on abnormal traveling to the terminal and outputs a notification through the terminal 300, and controls a location where the abnormal traveling occurs to be displayed on a map.

After abnormal traveling occurs, the controller 110 may set re-cleaning for a location or an area where the abnormal traveling occurs. In addition, the controller 110 may set re-cleaning by setting an area connecting locations where abnormal traveling occurs. After abnormal traveling occurs, the controller 110 determines whether it is possible to travel, and when it is possible to travel, the controller returns to a moving path and continues cleaning.

The controller 110 returns to the moving path to complete predetermined cleaning in operation S360, and moves to the location or area where the abnormal traveling occurs to perform cleaning again in operation S380. In some cases, at a time when abnormal traveling occurs, the controller 110 may immediately perform cleaning on a location or an area where the abnormal traveling occurs, and may return to a moving path to perform preset cleaning.

When re-cleaning is completed, the controller 110 completes cleaning of the area in operation S390. In addition, the controller 110 may accumulatively store data on a location or an area where abnormal traveling occurs, and when abnormal traveling occurs at a particular location or area more than a set number of times, the controller may set the location or area as a separate exceptional area. When the exceptional area for abnormal traveling is set, the controller 110 may perform cleaning except for the corresponding area, may first clean the exceptional area or clean the exceptional area lastly or perform intensive cleaning on the area repeatedly multiple times.

In addition, when abnormal traveling occurs, the controller 110 may output a notification that request replacement of the cleaning cloth. In the case of abnormal traveling due to foreign substances, it is possible to request the cleaning cloth because the cleaning cloth is possibly contaminated. The notification requesting the replacement of the cleaning cloth may be output through the output unit and the terminal.

After the cleaning cloth is replaced, the controller 110 may move to perform cleaning again, or after the area where abnormal traveling occurs is cleaned again, the cleaning cloth may be replaced and other areas may be cleaned. A cleaning cloth replacement time and a re-cleaning order may be changed according to a setting or according to a user command input through the terminal.

The moving robot according to the present exemplary embodiment operating as above may be implemented in the form of an independent hardware device, and is driven in a form included in other hardware devices such as a microprocessor or general purpose computer system as at least one processor.

While the present disclosure has been described with reference to exemplary embodiments, it will be apparent to those skilled in the art that various changes and modifications may be made without departing from the spirit and scope of the present disclosure. Therefore, exemplary embodiments of the present disclosure are not limiting, but illustrative, and the spirit and scope of the present disclosure is not limited thereto.

The moving robot according to an embodiment may be implemented in the form of an independent hardware device and may be driven in the form of being included in another hardware device such as a micro-processor or a general purpose computer system as at least one or more processors.

While the present disclosure has been described with reference to exemplary embodiments, it will be apparent to those skilled in the art that various changes and modifications may be made without departing from the spirit and scope of the present disclosure. Therefore, exemplary embodiments of the present disclosure are not limiting, but illustrative, and the spirit and scope of the present disclosure is not limited thereto.

What is claimed is:

1. A mobile robot, comprising:
   a main body configured to travel on a surface and remove foreign substances from the surface;
   a spin mop coupled to the main body, wherein the spin mop includes a first rotary plate with a first cleaning cloth and a second rotary plate with a second cleaning cloth, wherein the main body is configured to travel on the surface in response to rotation of the spin mop; and
   a controller configured to (a) set a traveling pattern of the mobile robot on the surface, (b) set a moving path of the main body based on the set traveling pattern, (c) determine a traveling state of the mobile robot by calculating a location change of the main body during traveling, (d) detect an occurrence of abnormal traveling during the traveling, wherein abnormal traveling occurs when the moving path of the main body deviates from the set moving path, (e) output a notification in response to the occurrence of abnormal traveling, and (f) activate automatically re-cleaning to clean a location where the abnormal traveling occurs after completing the traveling pattern for an area,
   wherein the controller is further configured to determine whether abnormal traveling occurs due to slipping of the spin mop caused by the foreign substances on the surface on which the main body is traveling, and
   wherein the controller sets automatically the re-cleaning to clean the location where the abnormal traveling occurs so that the main body moves in a straight direction.

2. The mobile robot of claim 1, wherein the controller is further configured to (i) determine that abnormal traveling is occurring when a distance between a location of the main body and the set moving path becomes greater than or equal to a predetermined distance, and (ii) store the location where the abnormal traveling occurs.

3. The mobile robot of claim 1, wherein, when abnormal traveling occurs, the controller is further configured to determine whether the abnormal traveling is caused by at least one of (i) an obstacle, (ii) an abnormality in a motor that rotates the spin mop or in a driving unit, or (iii) absence of the first or second cleaning cloths.

4. The mobile robot of claim 1, wherein, when re-cleaning is activated, the controller is further configured to (i) perform the re-cleaning, and (ii) return to the set moving path to perform preset cleaning after the re-cleaning.

5. The mobile robot of claim 1, wherein, when re-cleaning is activated, the controller is further configured to (i) return to the set moving path to perform preset cleaning, and then (ii) move to a location or area where abnormal traveling occurs to perform the re-cleaning.

6. The mobile robot of claim 1, wherein, when re-cleaning is activated, the controller is further configured to perform re-cleaning of a location or area where the abnormal traveling occurs according to a changed traveling pattern.

7. The moving robot of claim 1, wherein the controller is further configured to (i) store data on a location where abnormal traveling occurs, (ii) when abnormal traveling occurs at a particular location a predetermined number of times, set the particular location as an exceptional area, and (iii) perform a re-cleaning operation of the exceptional area.

8. The mobile robot of claim 7, wherein, in the re-cleaning operation, the controller is further configured to first clean other areas except the exceptional area and then clean the exceptional area.

9. The mobile robot of claim 7, wherein, in the re-cleaning operation, the controller is further configured to repeat re-cleaning of the exceptional area a preset number of times.

10. The mobile robot of claim 1, further comprising an output unit configured to output an operating state of the mobile robot, wherein the output unit is configured to, in response to a command from the controller, generate the notification by combining at least one of a warning message, a warning sound, and a warning light and output the notification.

11. The mobile robot of claim 1, wherein the controller is further configured to transmit data on a location or an area where abnormal traveling occurs to a terminal, wherein the terminal displays the location where the abnormal traveling occurs on a map.

\* \* \* \* \*